United States Patent [19]
Shimazaki et al.

[11] Patent Number: 5,379,418
[45] Date of Patent: Jan. 3, 1995

[54] HIGHLY RELIABLE ONLINE SYSTEM

[75] Inventors: Hiroyuki Shimazaki, Tokyo; Masamichi Mizoguchi, Yokohama; Hajime Yamasaki, Kawasaki; Kazuaki Ogawa, Osaka; Shinji Tanaka, Tokyo; Tatsushi Yano, Abiko; Takatoshi Shimizu, Kawasaki; Yukio Kouguchi, Tokyo; Tetsuo Yamashita, Matsudo; Satoshi Murabayashi, Yokohama; Nobuyuki Suzuki, Yokohama; Yoshikuni Watanabe, Yokohama; Koichi Nakagawa, Yokohama; Daisuke Fukagawa, Kashiwa; Kouji Ogino, Ichihara, all of Japan

[73] Assignees: Hitachi, Ltd.; The Sanwa Bank Limited, Tokyo, Japan

[21] Appl. No.: 129,960

[22] Filed: Sep. 30, 1993

Related U.S. Application Data

[63] Continuation of Ser. No. 660,633, Feb. 25, 1991.

[30] Foreign Application Priority Data

| Feb. 28, 1990 | [JP] | Japan | 2-045443 |
| Mar. 7, 1990 | [JP] | Japan | 2-053695 |
| Mar. 7, 1990 | [JP] | Japan | 2-053696 |
| Mar. 7, 1990 | [JP] | Japan | 2-053697 |

[51] Int. Cl.$^6$ ............................................. G06F 15/21
[52] U.S. Cl. ............................... 395/575; 371/9.1; 371/11.3
[58] Field of Search ................. 395/575; 371/9.1, 11.3

[56] References Cited

U.S. PATENT DOCUMENTS 5,060,185 10/1991 Naito et al.
5,123,099 6/1992 Shibata et al.

OTHER PUBLICATIONS

Nakagawa, et al., "Overview of New Banking System—SANABAC III System of the Sanawa Bank, Ltd. Hitachi Hyoron", pub., vol. 70 No. 3, pp. 19-26.

Primary Examiner—Vincent P. Canney
Attorney, Agent, or Firm—Fay, Sharpe, Beall, Fagan, Minnich & McKee

[57] ABSTRACT

A highly reliable online system is disclosed which is provided with a backup computer center (sub-online system) in addition with an original computer center (main online system) in order to improve the reliability of the online system. With respect to the database, the main online system is provided with an original database (main database) while the sub-online system is provided with a backup database (sub-database) which is a duplicate of the main database. The main online system and the sub-online system are connected through a transmission path. Information on an update performed in the main database is transferred to the sub-online system through the transmission path to thereby update the sub-database in a manner similar to the main database. Terminal units are normally connected to the main online system, wherein the main database is updated by transactions inputted from the terminals. When a failure occurs in the main online system, the terminals are changed over to be connected to the sub-online system to allow transaction processing to be continued. Further, there are provided a control system for synchronizing contents between the main database and the sub-database when the original computer center is changed over to the backup computer center, a recovery system for recovering the main database or the sub-database from failures and an integration system for integrating both the main database and the sub-database when they are independently updated due to a failure in the transmission path or the like.

7 Claims, 35 Drawing Sheets

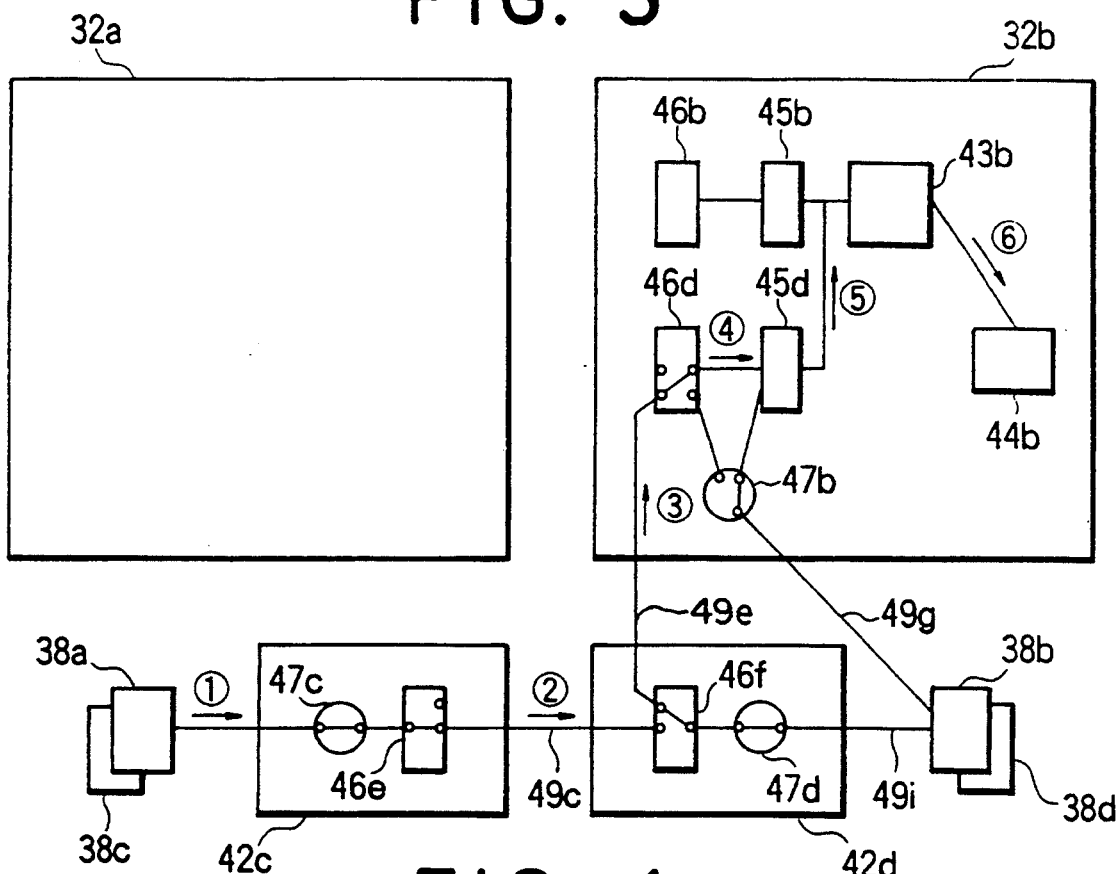
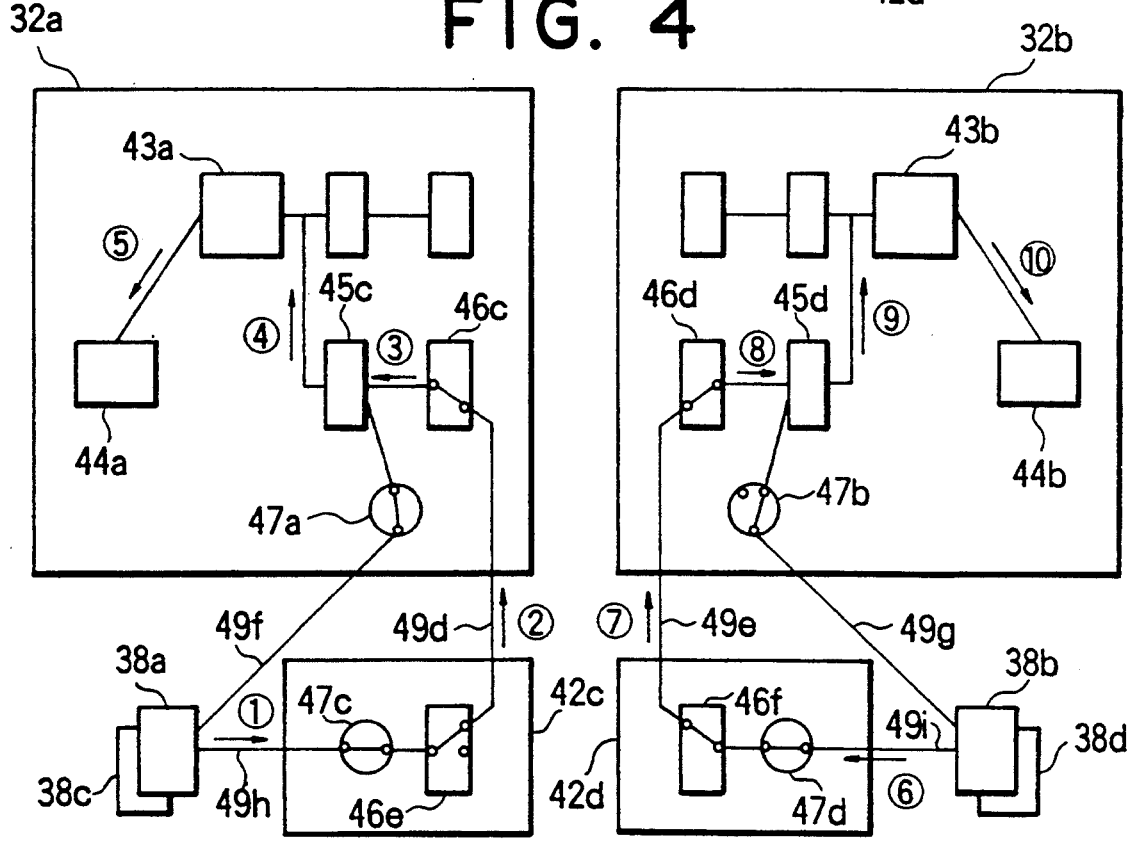

FIG. 9
① RECEPTION OF DATA WITH SKIPPED SEQUENCE NUMBER
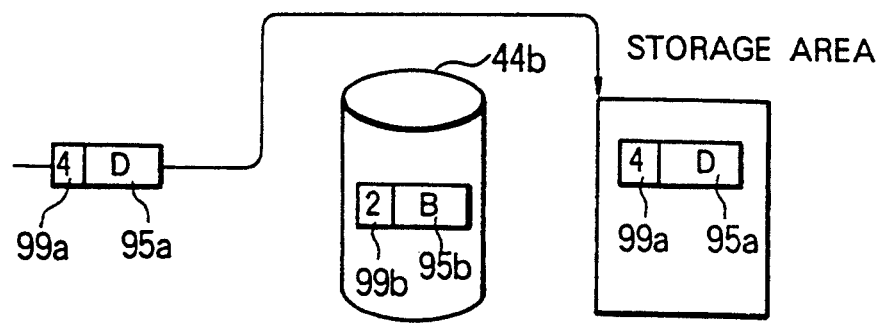
② RECEPTION OF DATA WITH NORMAL SEQUENCE NUMBER
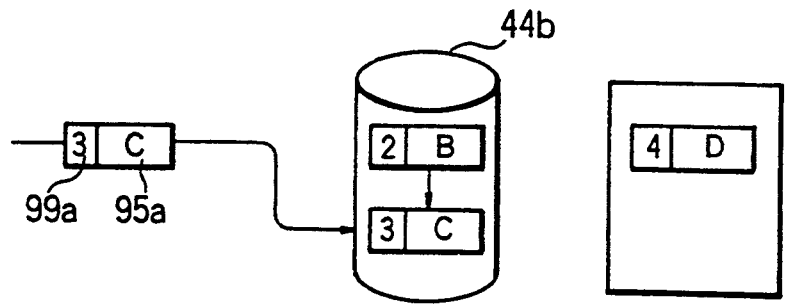
③ RECEPTION OF DATA WITH SKIPPED SEQUENCE NUMBER RESOLVED
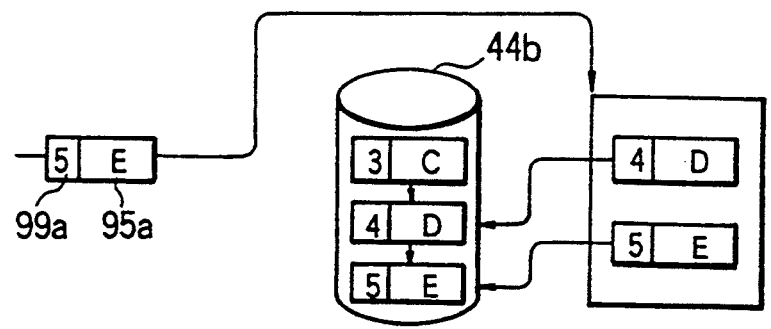

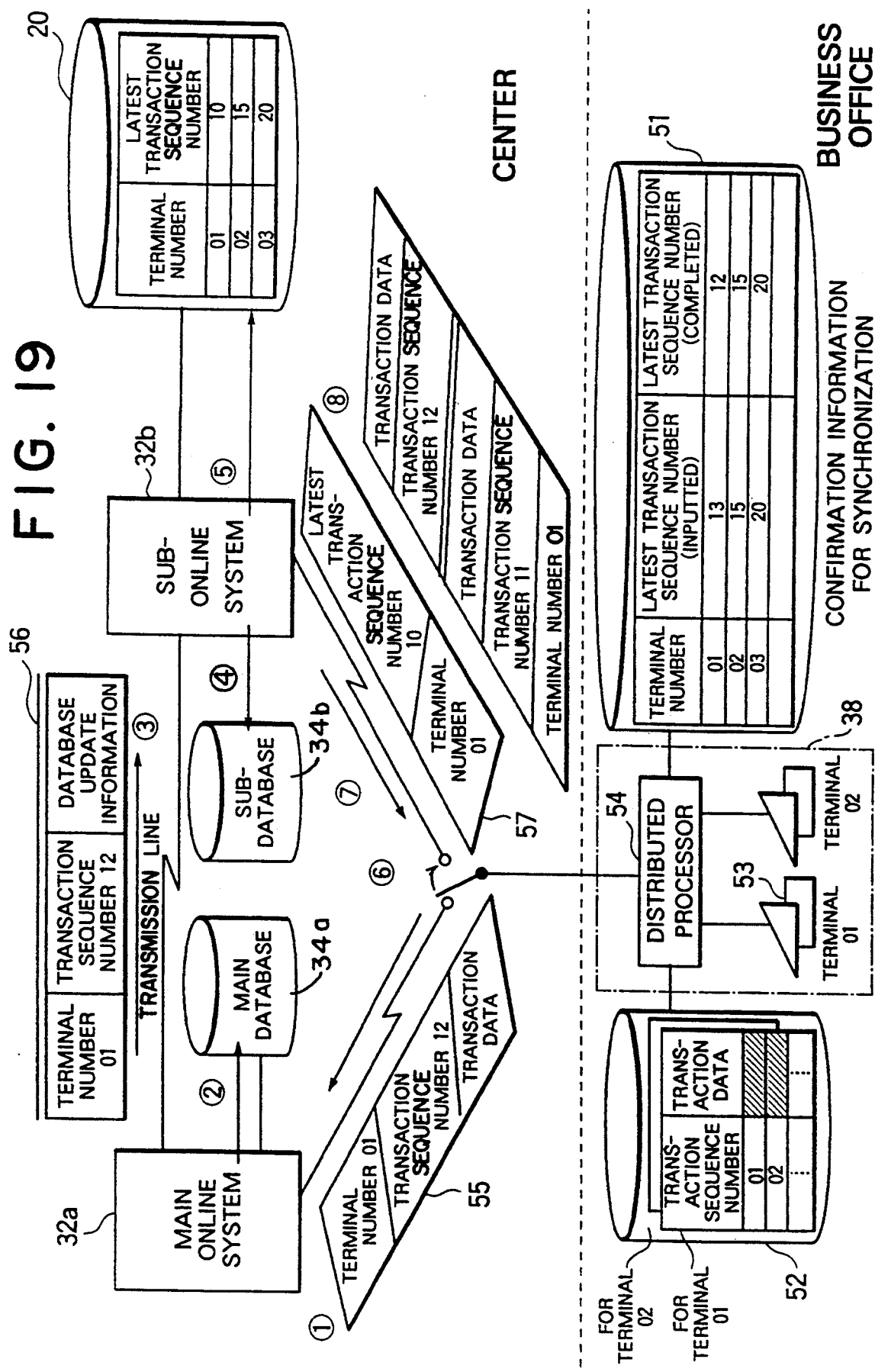

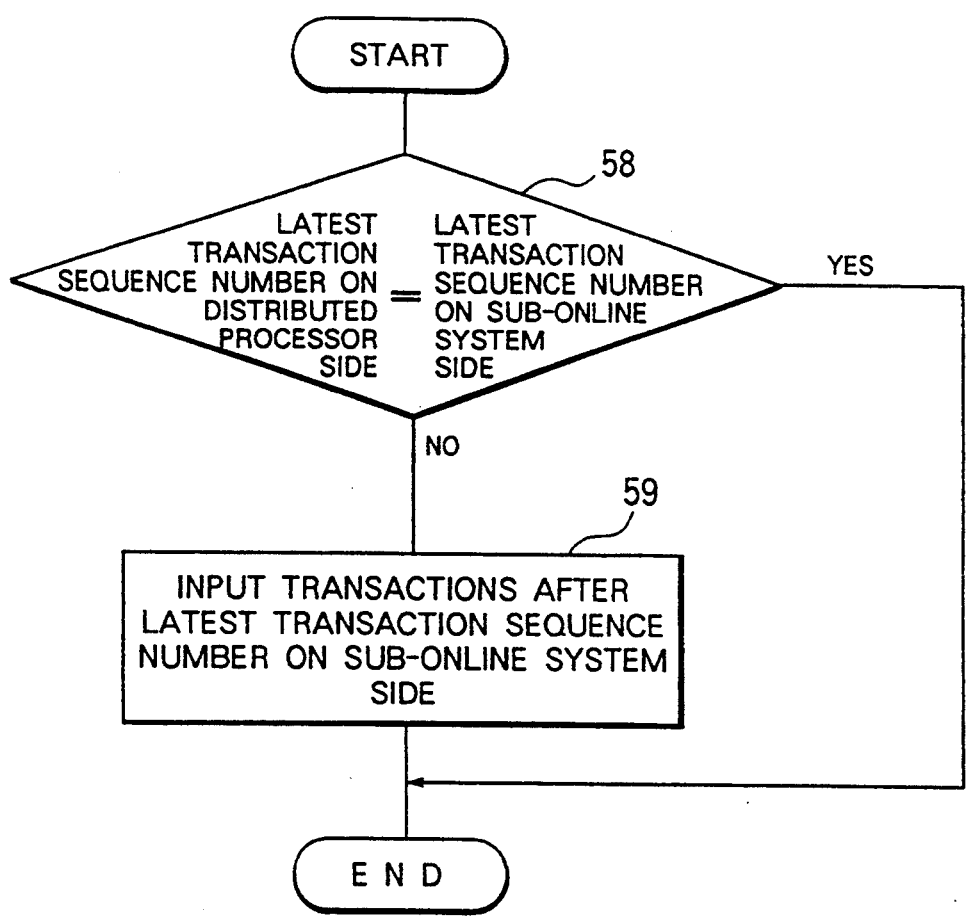

FIG. 32

| DATABASE UPDATE INFORMATION | | | | ADDITIONAL INFORMATION | |
|---|---|---|---|---|---|
| MAIN DATABASE UPDATE SEQUENCE NUMBER | SUB-DATABASE UPDATE SEQUENCE NUMBER | RECORD UPDATE TIME | RECORD UPDATE INFORMATION | INPUT TERMINAL NAME | TRANSACTION DATA SEQUENCE NUMBER | INPUTTED TRANSACTION DATA | ved by a highly reliable
HIGHLY RELIABLE ONLINE SYSTEM

This application is a continuation of U.S. application Ser. No. 07/660,633, filed on Feb. 25, 1991.

BACKGROUND OF THE INVENTION

The present invention relates to a highly reliable online system for a computer system having a database.

Conventionally, the following methods have been taken for improving the reliability of online systems. FIG. 38 is a diagram for explaining such methods.

A computer center 11 is provided with duplicate external storage units 13, 14 for storing database records 15, 16 and updating the same in an on-line fashion. The databse records 15, 16 are updated, when necessary, simultaneously from a central processing unit 12 (①). Thus, even if one of the external storage units 13 or 14 is unusable due to a failure, a duplicate storage of the identical database in different external storage units permits utilizing the database records stored in the other external storage unit.

Also, a backup of a database (DB) is stored in an external storage unit 17 which is not connected to the online system (②), and the storage unit 17 is preserved in the same computer center 11 to which the online system is connected or in another warehouse or a computer center 18 so as to allow the database to be recovered in case the external storage units 13, 14, or even with the external storage unit 17 included, are simultaneously unusable.

This type of art is disclosed, for example, in Japanese Patent Laid-open JP-A-61-196347 (1986) and so on.

The above-mentioned prior art implies the following problems in the online system which requires a high reliability, as will be hereblow explained with reference to FIG. 39:

(1) If the computer center 11 suffers from a disaster (A), terminals 24a, 24b, 24c, 24d become all inoperable. The recovery of the database is also impossible due to such a disaster.

(2) If a wide area 21 including the computer center 11 (an area including a plurality of adjacent prefectures, cities, towns or villages) suffers from a disaster (B), not only the terminals 24a, 24b included in the computer center 11 but also the terminals 24c, 24d included in a wide area 25, which was not hit by the disaster, becomes unusable for online operations. The recovery of the database is not possible due to this type of disaster.

(3) If a disaster occurs in a transmission line 26b connecting a computer 23 and the terminals 24c, 24d for operating the computer between the wide area 21 including the computer center 11 and another wide area 25 (C), the terminals 24a, 24b included in the wide area 21 can be used for online operations, whereas the terminals 24c, 24d in the wide area 25 cannot be used.

(4) When the computer center needs a construction work on a large scale for maintaining the reliability of hardware, attending to the operating performance or the like, it is necessary to temporarily interrupt the online service.

SUMMARY OF THE INVENTION

It is an object of the present invention to construct an on-line system which is capable of solving the above-mentioned problems.

The above object can be achieved by a highly reliable online system comprising an original computer center for updating records relative to an original database on the basis of transactions inputted from terminals and delivering information on the update performed for this database and a backup computer center for updating records relative to a backup database on the basis of this received update information. More specifically, the object can be achieved by a system which operates in the following manner (see FIG. 1).

(1) A backup computer center 32b is provided, as a computer center in addition to the original computer center 32a, wherein each of the centers are provided with computers 33a, 33b, and databases 34a, 34b, respectively. Normally, terminals in the original computer center 38a, 38b, 38c, 38d are connected to the computer 33a in the original computer center 32a through an original transmission path 36a to utilize the original database 34a. When contents of the original database 34a is updated, update information is reflected to the backup database 34b through a database transmission path 35, whereby contents of the backup database 34b follows the contents of the original database 34a in real time or with a delay of a predetermined time period (this is referred to as "quasi-real time").

When the original computer center suffers from a disaster, the transmission path for connecting the terminals to the computer is changed over from the original transmission path 36a to a backup transmission path 36b by way of switches 37a, 37b (①, ②), to thereby permit the utilization of the backup database 34b from the terminals. It should be noted that the damaged original database 34a can be recovered on the basis of the backup database 34b.

(2) A wide area 31a including the original computer center is spaced apart from a wide area 31b including the backup computer center by such a distance as to prevent both wide areas from being damaged by a single cause such as an earthquake.

When a disaster occurs in the wide area 31a including the original computer center, the transmission path which connects the computer with the terminals 38b, 38d is changed over by the switch 37b (②) to thereby permit utilizing the database in areas outside the disaster-stricken area.

(3) The database transmission path 35, the original transmission path 36a and the backup transmission path 36b all include portions which interconnect wide areas (these portions are referred to as "an inter-area main line group"). If a disaster causes a stoppage of all the inter-area main line group 39, the transmission path for connecting the terminals 38b, 38d to the computer is changed over to the backup transmission path by means of the switch 37b (②) to thereby permit utilizing the database with terminals in the wide areas where the respective computers are located.

(4) If the original computer center needs a large scale construction work, the terminal connection is changed intentionally in a manner similar to the foregoing (1) to allow the construction of the original computer center without interrupting the online service thereof.

It is another object of the present invention to provide an online system which is capable of synchronizing contents of an original database (a main database) with those of a backup database (a sub-database) when an original computer center (a main online system) is changed over to a backup computer center (a sub-computer center).

The above object is achieved by providing the terminal side with functions for transmitting a transaction sequence number and transaction data to the main on-line system as well as storing the same, wherein the main online system is adapted to transmit update information thereof and transaction sequence numbers for the respective terminals to the sub-online system. When the main on-line system is changed over to the sub-online system, the terminal receives the transaction sequence numbers from the sub-online system, compares the same with transaction sequence numbers possessed by itself and retransmits a number of transactions, the number being equal to the difference between the received transaction sequence number and the transaction sequence number stored in the terminal.

It is a further object of the present invention to provide an online system which is capable of facilitating the recovery of the main database or the sub-database which suffers from a disaster.

The above object is achieved by recovering the damaged original database on the basis of the backup database and recovering the damaged backup database on the basis of the original data base.

It is a yet further object of the present invention to provide an online system which is capable of facilitating the integration of the main database and the sub-database after updating the both respectively with different contents in parallel.

The above object is achieved by providing each database record with a main database update sequence number and a sub-database update sequence number, transmitting database update information and the above-mentioned database update sequence numbers from the sub-database side to the main database side and matching both database update sequence numbers, to thereby discriminate records which have been parallelly updated in both the main database and sub-database and records which have been individually updated only in the sub-database, wherein the individually updated records are reflected to the main database by transmitting database update information relative thereto, and parallelly updated records are reprocessed by inputted transaction data while observing the order of updating the records, to thereby integrate both databases.

BRIEF DESCRIPTION OF THE DRAWINGS

FIG. 3 is a block diagram showing a modification in structure which is made when the computer center suffers from a disaster;

FIG. 4 is a block diagram showing a modification in structure which is made when a disaster occurs in a transmission path connecting wide areas;

FIG. 9 is a diagram showing specific examples of the order of updating the sub-master-DB;

FIG. 19 is a structural diagram showing the other embodiment in detail;

FIG. 20 is a flowchart showing a processing flow on the terminal side;

FIG. 21 is a diagram showing a data format of synchronization acknowledge information;

FIG. 32 is a diagram showing a format of database update information with additional information;

DESCRIPTION OF THE PREFERRED EMBODIMENTS

Embodiments of the present invention will hereinafter be explained with reference to the accompanying drawings.

(1) System Structure

Figure 1:
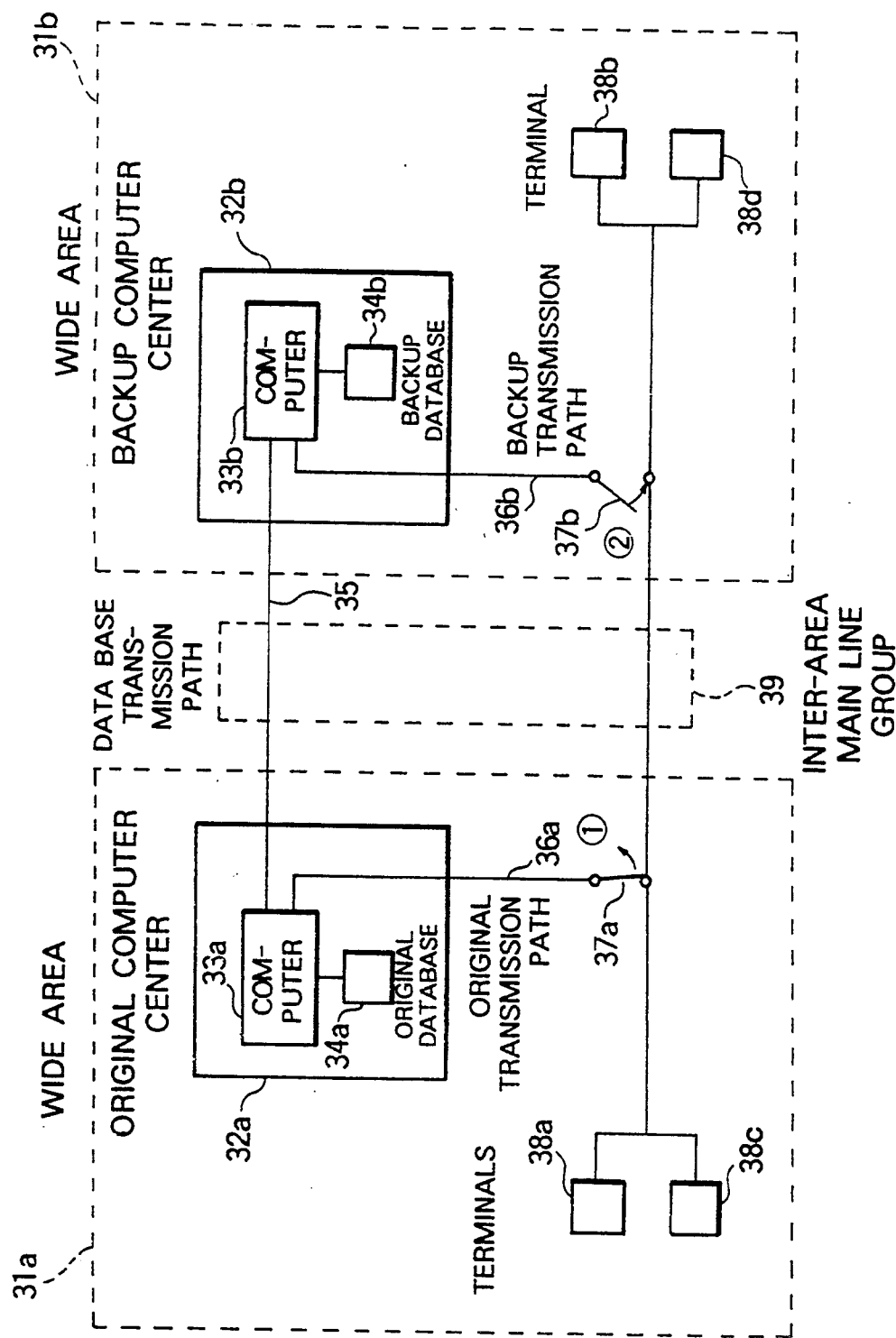
FIG. 1 is a systematic structural diagram showing the concept of a highly reliable online system.
Figure 2:
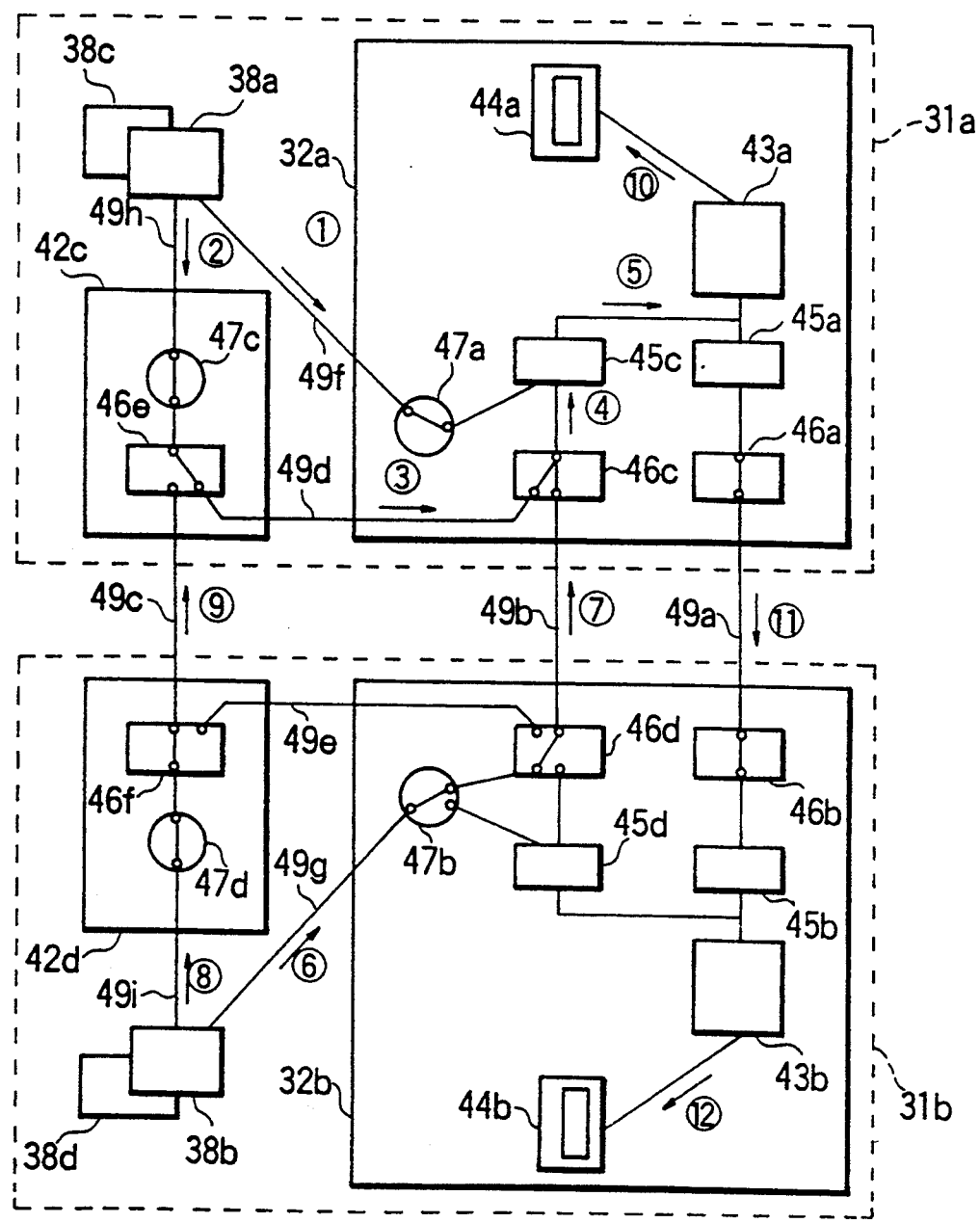
FIG. 2 is a block diagram showing an embodiment of a highly reliable online system.

FIG. 2 shows an outline of a system according to the present invention and a normal connecting configuration thereof. A terminal 38a in an original computer center 32a (also referred to as "the main online system) is connected to two special paths 49f, 49h, wherein a half of transaction data inputted from the terminal 38a is delivered to a central processing unit 43a through the special path 49f (①), a packet exchanger 47a and a communication control unit 45c (⑤). In a similar manner, the remaining half of the transaction data passes through the special path 49h (②), a packet exchanger 47c, a multiplex transmission unit 46e, a high speed cable 49d, a multiplex transmission unit 46c and the communication control unit 45c (③, ④, ⑤). A similar processing is performed with respect to a terminal 38c. On the other hand, a half of transaction data inputted from a terminal 38b in a backup computer center 32b (a sub-online system) passes through a special path 49g, a packet exchanger 47b, a multiplex transmission unit 46d, a high speed cable 49b, the multiplex transmission unit 46c, while the remaining half of the data passes through a special path 49i, the packet exchanger 47d, a multiplex transmission unit 46f, a high speed cable 49d, a multiplex transmission unit 46e, a high speed cable 49d, the multiplex transmission unit 46c and the communication control unit 45c in a similar manner. With the terminal 38d, a similar data transmission is performed. The central processing unit 43a processes transaction data, which leads to updating a main master-DB 44a corresponding to an original database 34a ( 10 ). Updated data in the main master-DB 44a is transmitted from the central processing unit 43a to a central processing unit 43b in the backup computer center 32b through the communication control unit 45a, the multiplex transmission unit 46a, the high speed cable 49a, the multiplex transmission unit 46b and the communication control unit 45b. Such a database update processing performed by the central processing unit 43b causes updating a sub-master-DB 44b corresponding to a backup database 34b which thereby follows the main master-DB 44a. Incidentally, the database transmission path 35 in FIG. 1 is developed as the high speed cables 49a, 49b in FIG. 2. Therefore, the high speed cables 49a, 49b, 49c constitute the inter-area main line group 35. Further, the special paths 49f and the high speed cable 49d is developed in FIG. 2 in place of the original transmission path 36a in FIG. 1.

FIG. 3 shows a connection configuration of two wide areas modified after a disaster has been occurred in the original computer center 32a.

Transaction data from the terminal 38a is delivered to the central processing unit 43b disposed in the sub-online system through the packet exchanger 47c and the multiplex transmission unit 46e both disposed in a relay center 42c (①), the high speed cable 49c (②), the multiplex transmission unit 46f, the high speed cable 49e, the multiplex transmission unit 46d and the communication control unit 45d (③, ④, ⑤). A transaction data processing performed by the sub-online system causes the sub-master-DB 44b to be updated (⑥). Transaction data from the terminal 38b is also processed by the sub-online system in a similar manner, which leads to updating the sub-master-DB 44b.

Figure 5:
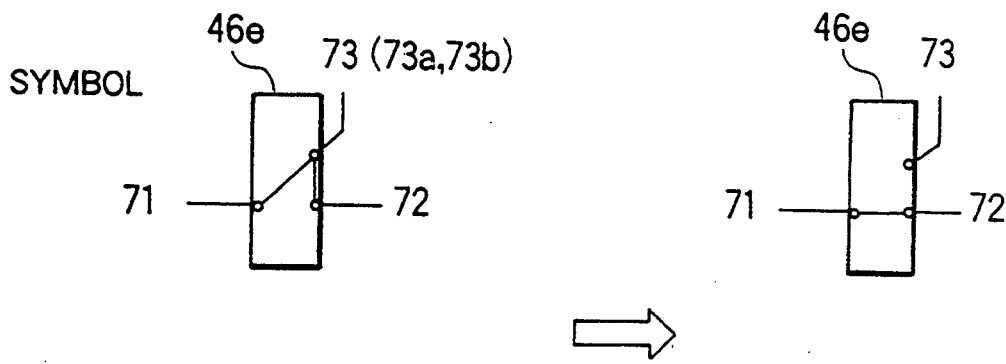
FIG. 5 is a diagram used for explaining a method of changing over cables of a multiplex transmission apparatus.

If the original computer center 32a suffers from a disaster, connection cable definitions in the multiplex transmission units 46e, 46f, 46d are modified. FIG. 5 shows a method of modifying the connection cable definition in the multiplex transmission unit 46e, wherein reference numerals 71, 72, 73 designate addresses of cables to be connected, respectively. In the multiplex transmission unit 46e, a table entitled "Corresponding Table in Unit" indicating addresses corresponding to cables to be relayed is set as shown on the left side in FIG. 5. Reference numerals 73a, 73b indicate the same address 73 only to distinguish one from another on the table. This table is modified as shown in a table on the right side of FIG. 5 on the instructions from the backup computer center 32b. Stated another way, the table on the left side is replaced by the table on the right side which is reloaded from a floppy disk drive connected to the multiplex transmission unit 46e. Tables in the multiplex transmission units 46f, 46d may be also modified in a similar manner.

Figure 6:
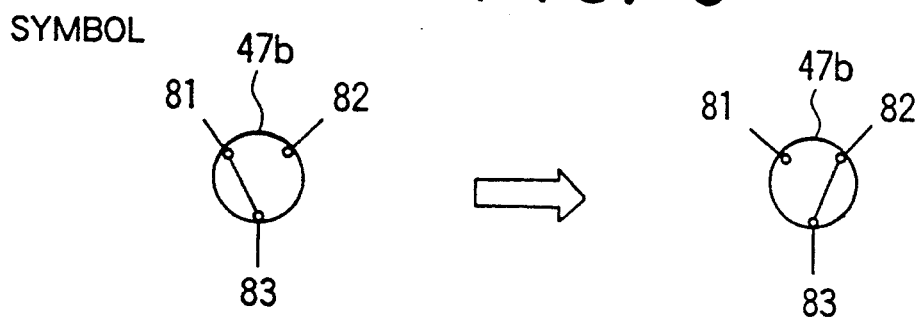
FIG. 6 is a diagram used for explaining how a path change performed in a packet exchanger.

FIG. 6 shows a method of changing a cable connection in the packet exchanger 47b, wherein reference numerals 81, 82, 83 designate addresses of cables to be connected in the packet exchanger 47b. The packet exchanger 47b has a table entitled "Table Definition" as shown on the left side of the second row in FIG. 6. This table is not modified even when the cable connection is changed. However, instead of modifying the table, a header of a message transmitted from the terminal 38b is modified from "1" indicative of normality to "2" indicative of abnormality, whereby the packet exchanger 47b identifies the modified header and modifies the cable connection by referring to the table. The modification in the header is instructed from the backup computer center 32b to the terminal 38b when an abnormality occurs.

A cable change-over operation and a data flow when the wide area 31a including the original computer center suffers from a disaster are similar to those as shown in FIG. 3. However, the terminal 38a and the relay center 42c do not exist.

Next, FIG. 4 shows a cable change-over operation and a flow of transaction data when the high speed digital cable which connects the main online system and the sub-online system suffers from a disaster.

The main online system does not need a modification in the cable connection, so that transaction data from the terminal 38a reaches the main online system in a manner similar to FIG. 2 to update the main master-DB 44a (①-⑤). On the other hand, in the sub-online system, there are a modification of the cable connection definition in the multiplex transmission units 46d, 46f and a modification of the cable connection in the packet exchanger 47b due to a change in the header of the message which is transmitted between the central processing unit 43b and the terminal 38b. These modifications on the sub-online system side are similar to those in the case shown in FIG. 3.

If either of the centers requires a construction, the configuration shown in FIG. 2 is intentionally changed over to that shown in FIG. 3 to permit such a construction. A construction in the sub-online system is also possible in a similar manner.

Next, a processing for reflecting main master-DB update information in a normal operation to the sub-master-DB will be explained in detail with reference to FIG. 7.

Assume, for example, that the main online system is performing a bank accounting application. A transaction message inputted from a terminal 38 is analyzed by an application program 94a provided in the main online system 32a (①), and the main master-DB 44a is updated (②). In this event, DB (database) update information 95a is generated for updating the main master-DB. For reflecting the update information 95a of the main master-DB 44a to the sub-master-DB 44b, the DB update information 95a is queued in a transmission queue by means of a transmission processing program 98a (③) and read again for transmission to the sub-online system 32b (④).

The sub-online system 32b receives the DB update information 95a by means of a reception program 98b and writes the same in a reception queue 97b (⑤). Then, the information 95a is again read from the reception queue 97b by means of a read-out program 98c, and a DB reflection processing program 94b is started to which the DB update information is delivered (⑥).

The DB reflection processing program 94b reflects the DB update information to the sub-online system in accordance with the DB update information without accompanying any operation performed by the operator (⑦).

The main master-DB 44a and the sub-master-DB 44b have update sequence numbers 99a, 99b respectively for each record to record historical data on update processing (the record is a unit of information composed of a set of items). The update sequence number begins with "1" and is incremented by one every time the record is updated. In the example shown in FIG. 7, a record in the main master-DB 44a is shown to be updated from AAAA to BBBB, and the corresponding record in the sub-master-DB 44b is immediately before being updated from AAAA to BBBB.

Figure 7:
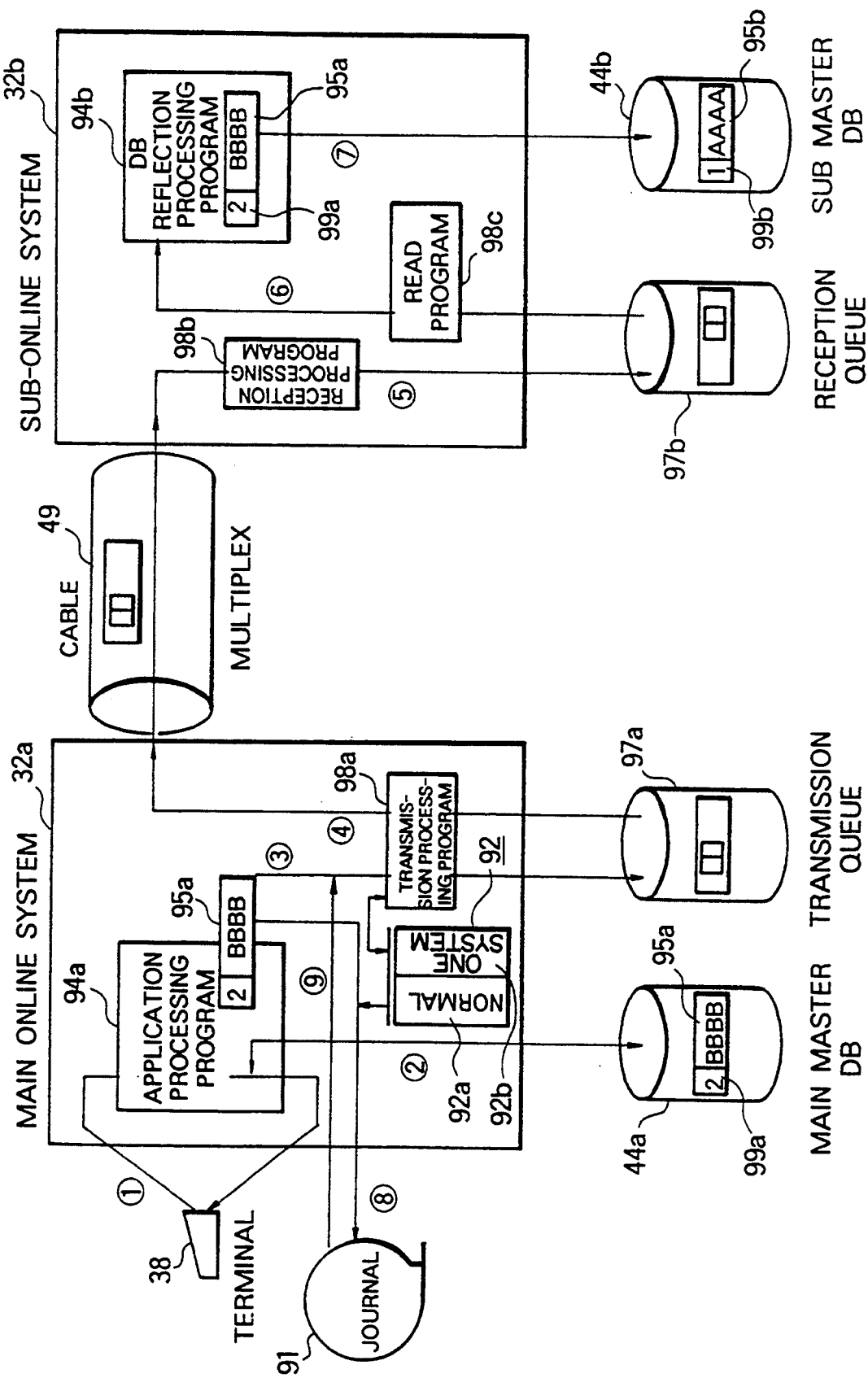
FIG. 7 is a functional block diagram showing a processing method for reflecting main master database (DB) update information to a sub-master database (DB)

If a counterpart center is inoperable due to a construction or the like, transmission ((④)) from the transmission queue 97a shown in FIG. 7 is impossible, whereby an overflow is caused in the transmission queue 97a. To cope with this overflow, a system mode storing area 92 is provided in a main storage, and also the DB update information 95a is outputted to an external recording medium as a journal 91 ((⑧)). The system mode storing area 92 includes a bit indicative of "normal 92a" and another bit indicative of "one system 92b". The normal 92a bit is set when the main online system and the sub-online system are both operable while the one system 92b bit is set when either of them is inoperable. In addition to the update sequence number 99a and the DB update information 95a, the above-mentioned system mode is written into the journal 91 in correspondence to respective DB update information 95.

The DB update information 95a is stored in the transmission queue 97a as well as usually outputted as the journal 91 ((⑧)). When both systems are operable, the system mode in which the normal 92a bit is set is written into the journal 91. If a counterpart system is inoperable due to a construction or the like, the normal 92a bit is reset while the one system 92b bit is set, so that the transmission processing program 98a does not write the DB update information 95a into the transmission queue 97a. At this time, the system mode in which the one system bit is set is written into the journal 91. When the counterpart center resumes its operation, for example, by the termination of a construction, the journal 91 is read, and the DB update information 95a having the system mode set at one system, included in the journal 91, is solely transmitted to the counterpart center through the transmission queue 97a ((⑨), (④)).

Also, if the storage unit for storing the transmission queue 97a suffers from a disaster, the DB update information 95a cannot be transmitted from the main online system to the sub-online system. Also on this occasion, when the storage unit is recovered from the disaster, the DB update information 95a, which has not been transmitted to the counterpart center due to the disaster, is solely extracted from the journal 91 and transmitted to the counterpart center through the transmission queue 97a ((⑨), (④)). To facilitate such a recovery from a disaster, the journal 91 includes information necessary to treat the respective DB update information 95a, however, a detailed explanation thereof will be omitted.

Figure 8:
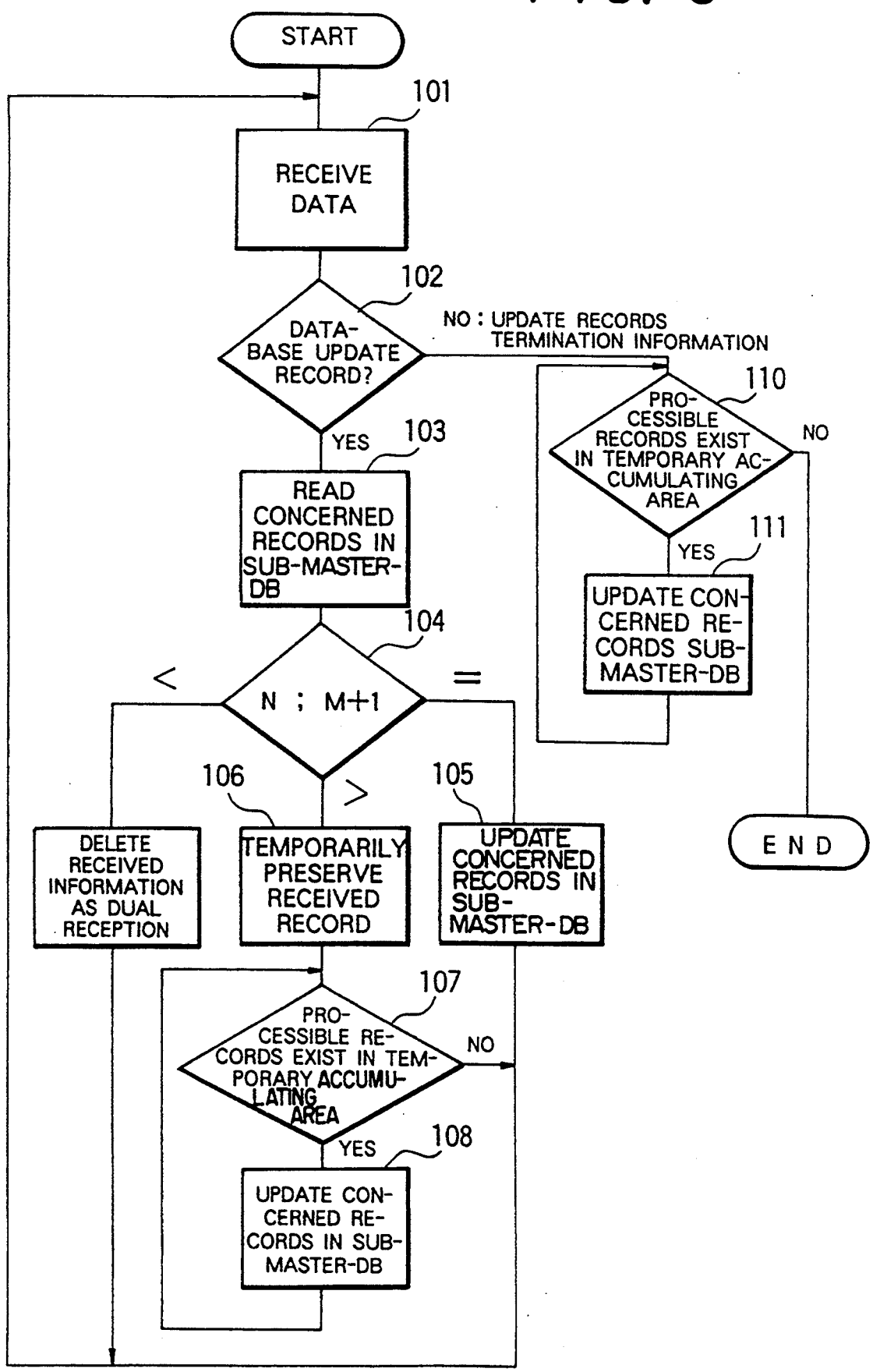
FIG. 8 is a flowchart showing a procedure of a sub-master-DB reflecting program.

FIG. 8 is a flowchart showing the procedure of the DB reflection processing program 94b in detail. After the reception processing program 98b has received data (step 101), the DB reflection processing program 94b determines whether or not the received data is a database update record (step 102). If the data is a database update record, the concerned record is read from the sub-master-DB 44b (step 103), and then a database update sequence number (N, 99a) included in the received record is compared with a value produced by incrementing by one a database update sequence number (M, 99b) included in the concerned record in the sub-master-DB (step 104). If N=M+1 is satisfied as a result of the comparison, the concerned record in the sub-master-DB is updated by the received record (step 105). If N>M+1 stands, the received record is temporarily preserved in an accumulating area (step 106). If a record which satisfies N=M+1 has already been preserved in the accumulating area or if the answer to step 107 is YES, the concerned record in the sub-master DB is updated by this record (step 108). This processing is repeated in this manner until records having sequential sequence numbers preserved in the accumulating area are exhausted. If N<M+1 stands at step 104, it means that the update record has been twice received, so that the received information is deleted (step 109). When information announcing that transmission of update records has been terminated is received from the main-online system or if the answer to step 102 is NO, concerned records in the sub-master-DB are updated until records having sequential sequence numbers and satisfying N=M+1, which have been previously preserved in the accumulating area, are exhausted (steps 110, 111).

FIG. 9 shows an example of updating a record in accordance with the processing flow shown in FIG. 8.

In ①, a received record having a skipped sequence number has been received and therefore is preserved in the accumulating area. In ②, a record having a sequential sequence number has been received so that the corresponding record in the sub-master-DB 44b is updated by the received record. In ③, a received record is temporarily preserved in the accumulating area, however, since the received record has a sequence number which is sequential to a sequence number possessed by the record previously stored in the accumulating area, the newly received record is reflected to the sub-master-DB 44b, subsequent to the previously stored record. As described above, the update order in record units can be ensured by means of the sub-online system.

Since the update order in record units is ensured by the sub-online system as described above, it is possible to transmit DB update information on the main online system side to the sub-system side in a multiplex manner. More specifically, a multiplex transmission of DB update information can be performed by physically providing a plurality of cables and logically setting a plurality of logical channels to these cables.

Figure 10:
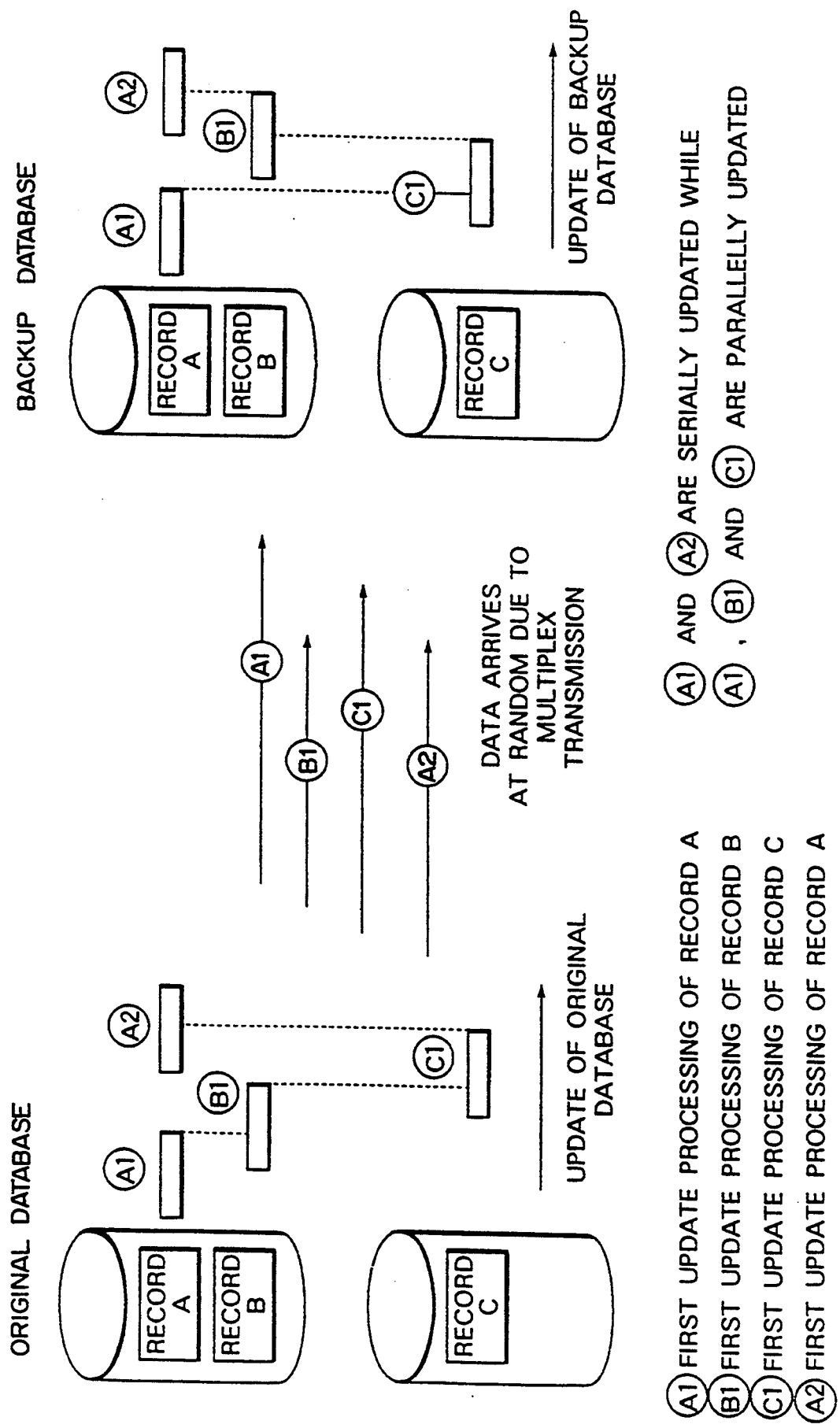
FIG. 10 is a diagram showing an example of a multiplex transmission of database update information and a parallel update performed based on the update information on the sub-system side.

FIG. 10 shows an example of a multiplex transmission of the DB update information and a parallel update performed on records in the sub-online system with update information.

Figure 11:
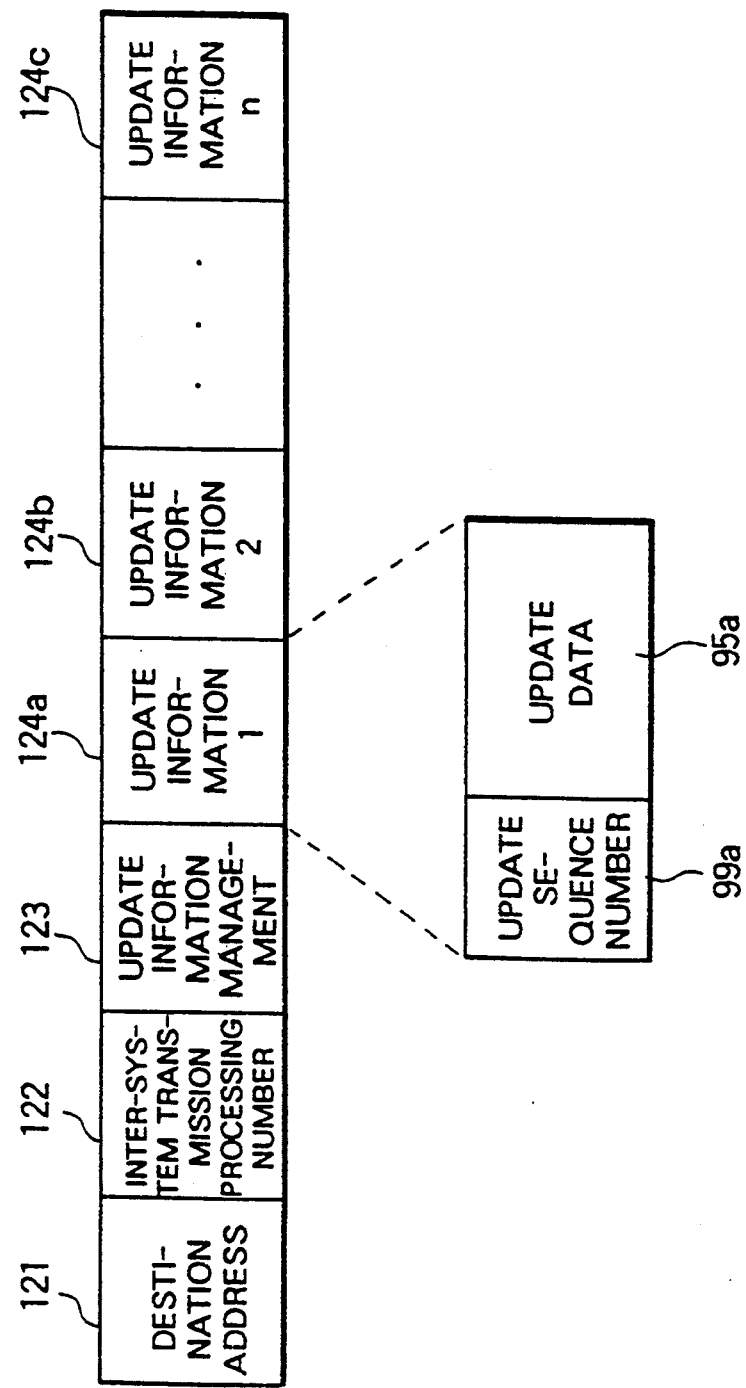
FIG. 11 is a diagram showing an exmaple of a format of transmission data which is transmitted from the main online system to the sub-online system.

FIG. 11 shows an example of a format of data transmitted from the main online system to the sub-online system. In the drawing, a destination address 121 is an address in the sub-online system from a view-point of the main online system, and an inter-system transmission processing sequence number 122 is added to provide the order to each cable since transmission processing is multiplexed by the cables or the like. An update information management unit 123 manages respective update information particularly when a plurality of update information 124a, 124b, 124c are transmitted in a block form. The respective update information is composed of an update sequence number 99a and update data 95a.

Figure 12:
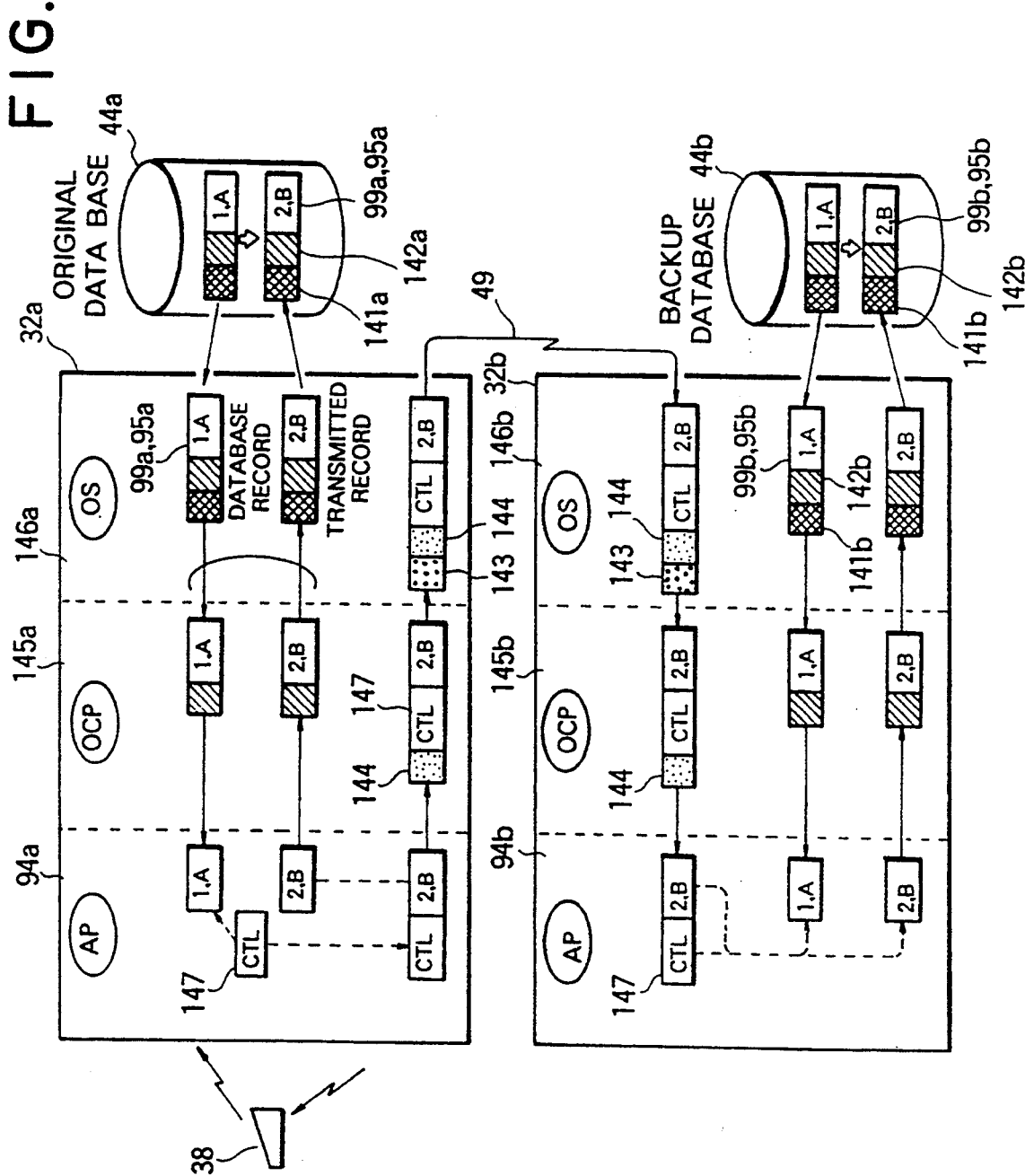
FIG. 12 is a diagram used for explaining a flow of database records and transmission records and a scope of physical addresses processed by programs in respective stages.

FIG. 12 shows a flow of database records and transmitted records in the original computer center 32a and the backup computer center 32b and a scope of physical addresses processed by programs in respective layers. Reference numerals 94a, 94b designate application programs, 145a, 145b the scope of online control programs, and 146a, 146b the scope of operating system (OS). Also, reference numeral 141 designates an absolute address in a disk in which a concerned record is stored, 147 designates logical management information for identifying the database record, 143 an absolute address of the cable 49 assigned for data transmission, and 144 a relative address of the cable 49. The OS 146 needs to be aware of the absolute address 141 in the disk in which the database records are stored, the relative address 142 of the same and the absolute address 143 and the relative address 144 of the cable 49. However, the online control program 145 only needs to be aware of the relative address 142 in the disk and the relative address 144 of the cable 49. The application program 94 need not be aware of any of these addresses. For this reason, DB update records delivered from the application program 94 through the cable 49 to the application program 94b does not have these physical addresses. A conclusion obtained from the above-mentioned consideration lies in that the main master-DB 44a and the sub-master-DB 44b can be laid out as databases (group) respectively independent of each other.

Figure 13:
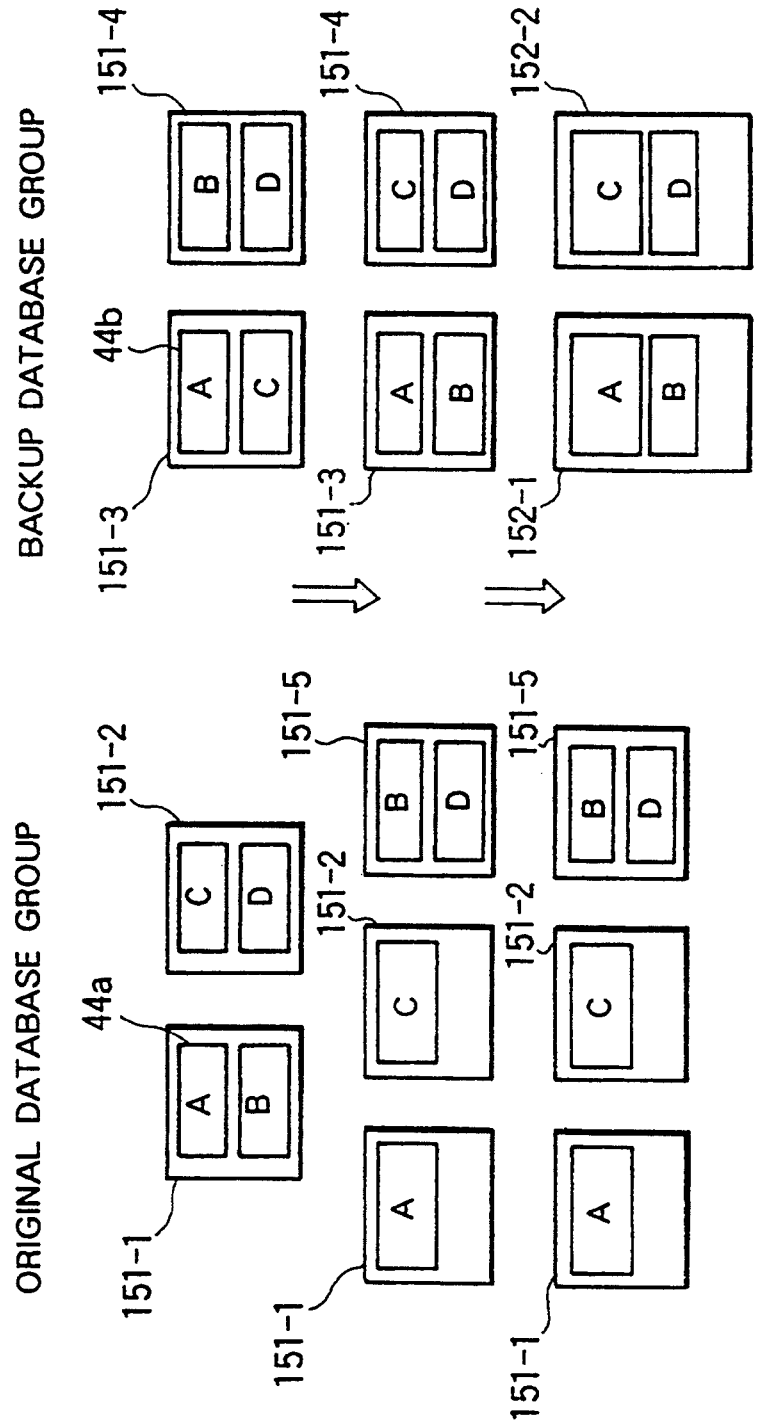
FIG. 13 is a diagram used for expalining an exmaple wherein the main online system and the sub-online system individually arrange databases in different lay-out.

FIG. 13 shows an example where the main master-DB 44a and the sub-master-DB 44b are independently assigned in physical recording media. Reference numeral 151 designates a recording medium having a small capacity and 152 a recording medium having a large capacity. Reference characters A, B, C, D designate databases constituting a database group. First, the databases A, B, C, D are stored in media 151-1, 151-2, 151-3 and 151-4, respectively. Next, the capacities of the databases A, C are enlarged so that a medium 151-5 is added to the main master-DB 44a and a database storing layout is modified as shown in FIG. 13. The sub-master-DB 44b, on the other hand, introduces large capacity media 152-1, 152-2 to modify the database storing layout. This example shows that the system has a highly extensible database.

Figure 14:
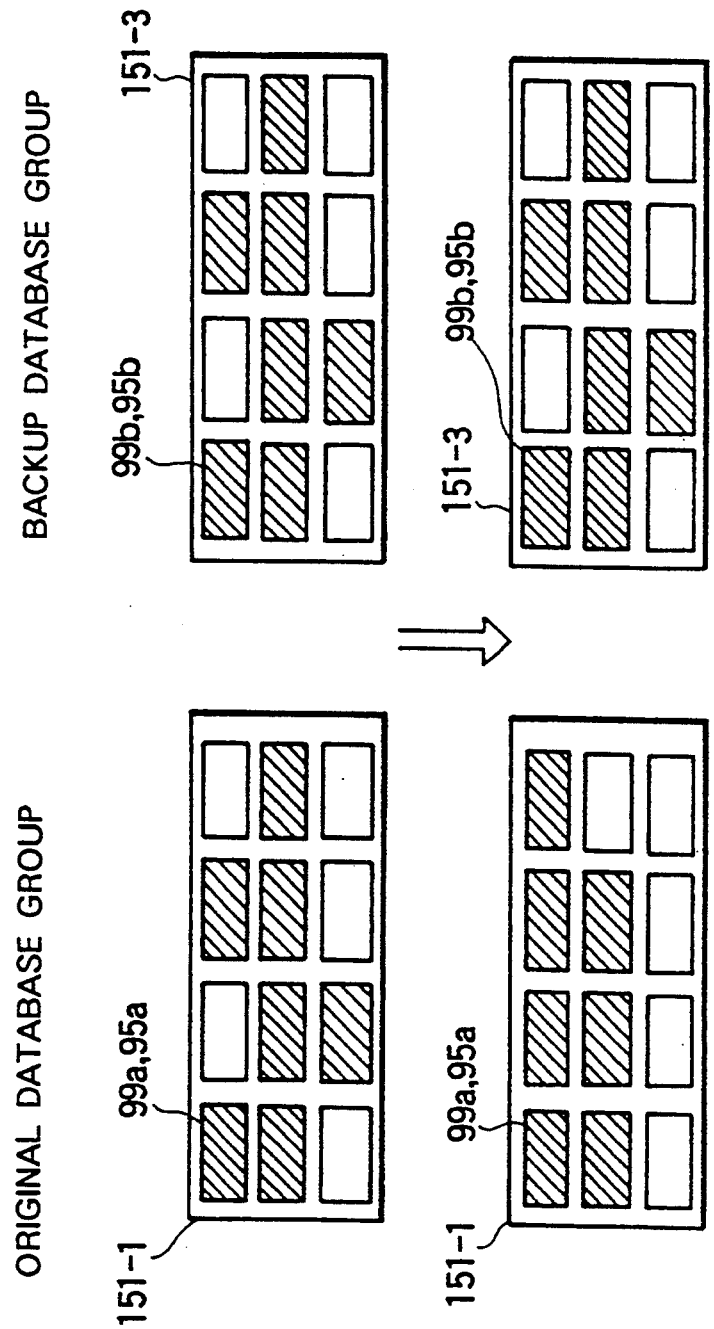
FIG. 14 is a diagram used for explaining an example wherein the main online system and the sub-online system individually organize different databases.

FIG. 14 shows an example where dispersed vacant areas are produced as a result of deletion and/or addition of records performed to the databases stored in the media 151-1 and 151-3. Hatched portions indicate record regions in use while blank portions indicate vacant record regions. In the example shown in FIG. 14, the database in the main master-DB 44a is rearranged to remove the vacant areas, however, the sub-master-DB 44b remains unchanged. This example shows a system having a high working efficiency of the database.

Finally, reference is made to the fact that the backup computer center 32b according to the present embodiment is a smaller online system than the original computer center 32a and accordingly can be built at a low cost.

Figure 15:
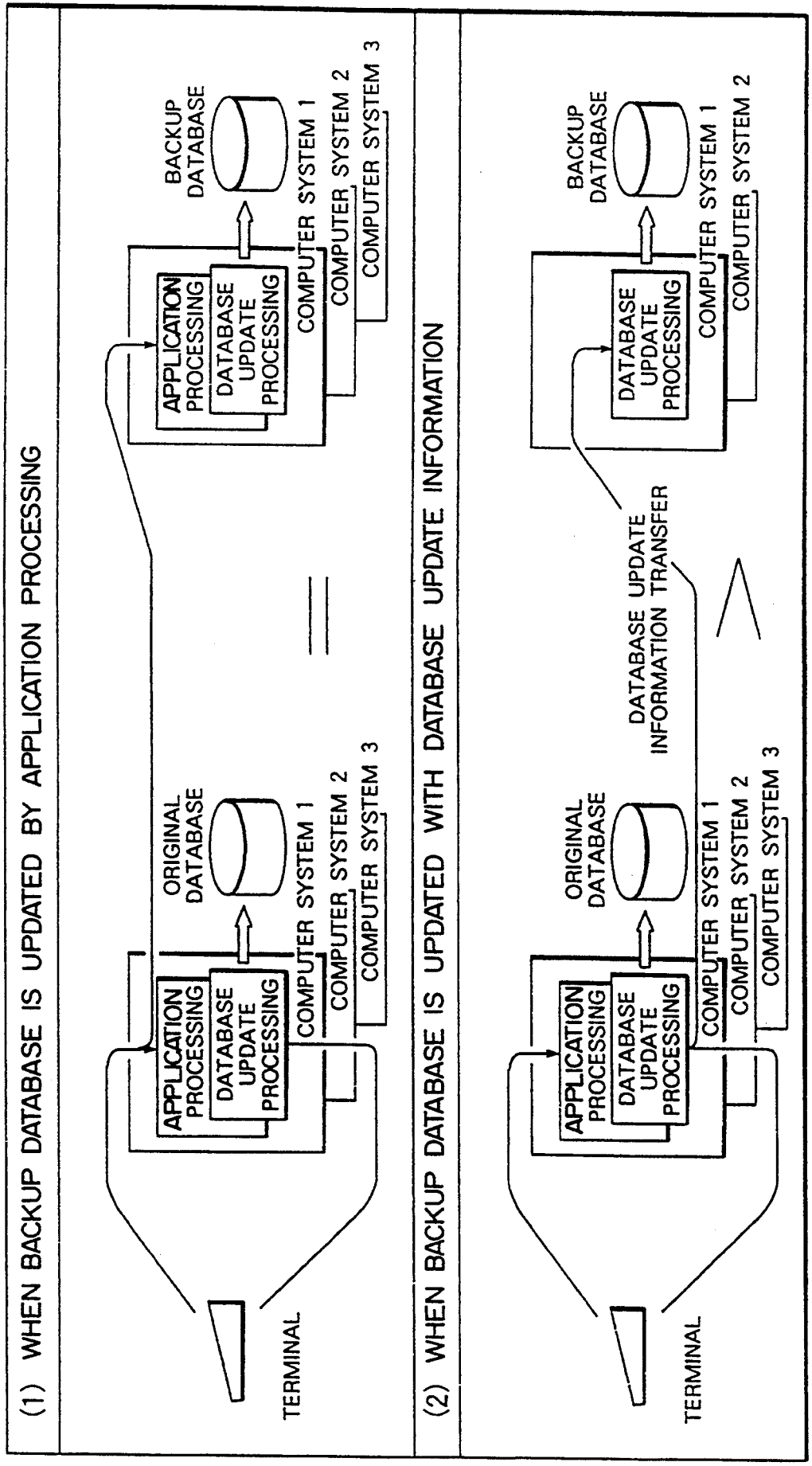
FIG. 15 is a diagram used for explaining the system size of the original computer center and the backup computer center.

FIG. 15 is a diagram used for schematically explaining the above-mentioned advantage. FIG. 15(1) shows that the backup computer center is supplied with the same transaction as that inputted to the original computer center and the same application processing as that performed by the original computer center is carried out in the backup computer center, wherein the system size of the backup computer center is the same as that of the original computer center. In FIG. 15(2), the backup computer center does not perform a variety of determinations based on inputted transaction information or transmission of processing results to the terminal. Instead, a special program for performing database update processing and reception processing of DB update information is executed, thereby rendering it possible to reduce the size of the backup computer center. However, the backup computer center in this case is limited to perform update processing for the backup database and accordingly will not back up the same application processing as the original computer center.

The above described embodiment of an online system can produce the following effects:

(i) The online database can be continuously utilized even if the computer center suffers from a disaster;

(ii) Even if a wide area including the computer center suffers from a disaster, the online database can be continuously utilized from areas outside the disaster-stricken area;

(iii) Even if a disaster occurs in a main line connecting wide areas which may result in interruption of the communication between the computer center and the user terminal, the online database can be utilized at remote areas to which the communication is being interrupted; and (iv) The online database can be continuously utilized even when the computer center is under construction.

(2) Synchronization Control of Database

A synchronization control between a main database and a sub-database in an online system as shown in the above-mentioned embodiment will hereinafter be discussed in detail.

Figure 16:
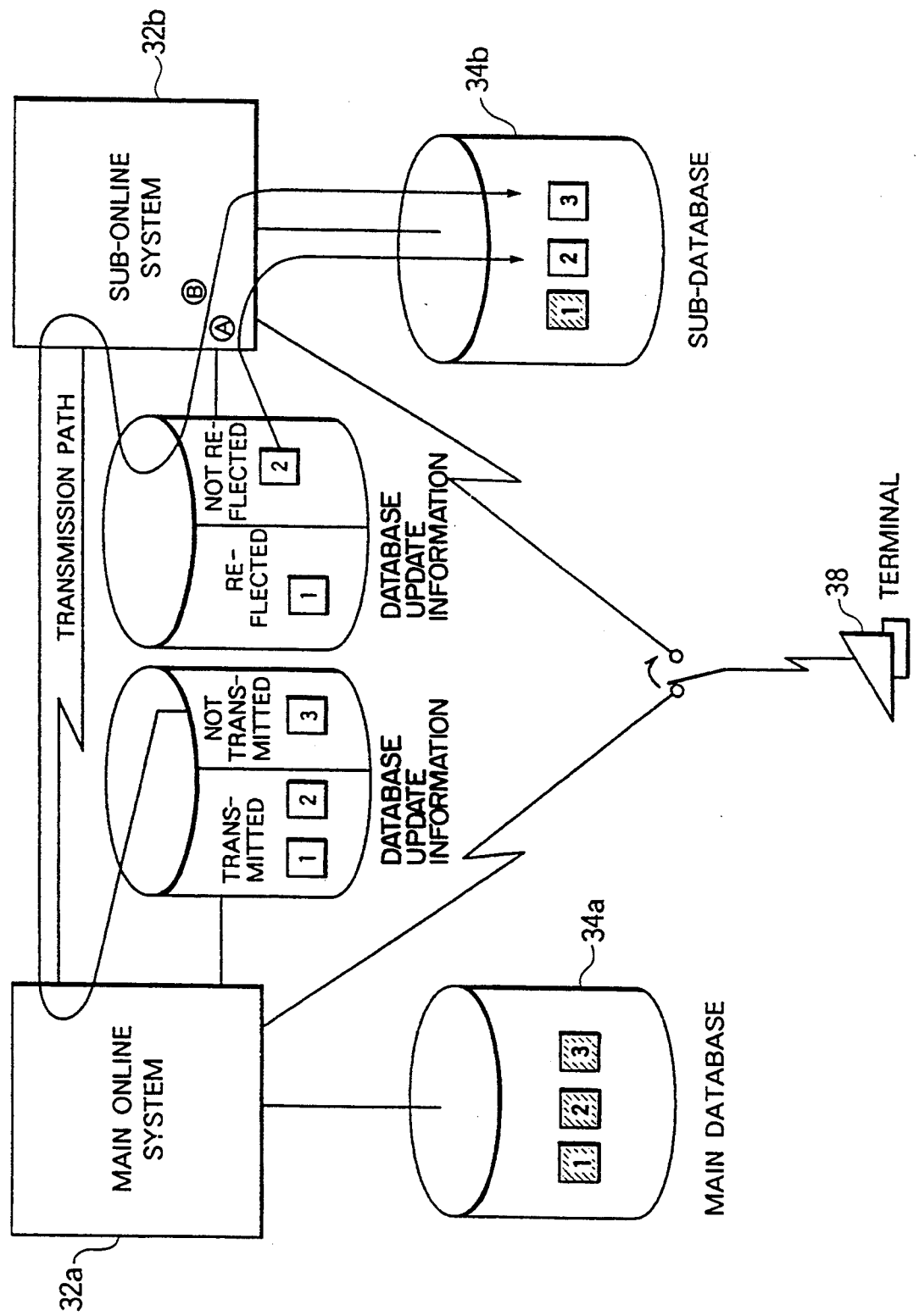
FIG. 16 is a diagram showing a condition in which a discrepancy is produced in contents between the main database and sub-database.

In FIG. 16, records NO. 1–NO. 3 including database update information are assumed to be update information relative to records NO. 1–NO. 3 in the database. It is also assumed that the update information record NO. 1 has already been reflected to a sub-database 34b, the update information record NO. 2 has not reflected to the sub-database 34b, and the update information record NO. 3 has not been transmitted to the sub-online system 32b.

If the main online system is changed over to the sub-online system 32b under the above-mentioned condition, contents of the main database are discrepant with those of the sub-database because the main online system 32a has main database update information which has not been transmitted to the sub-online system 32b (the database update information record NO. 3 in FIG. 16), and because the sub-online system 32b has main databse update information which has not been reflected to the sub-database in the sub-online system 32b (the database update information record NO. 2 in FIG. 16).

Next, explanation will be given of a discrepancy of contents between the main database and the sub-database which may be produced when a disaster occurs with reference to FIG. 17.

Figure 17:
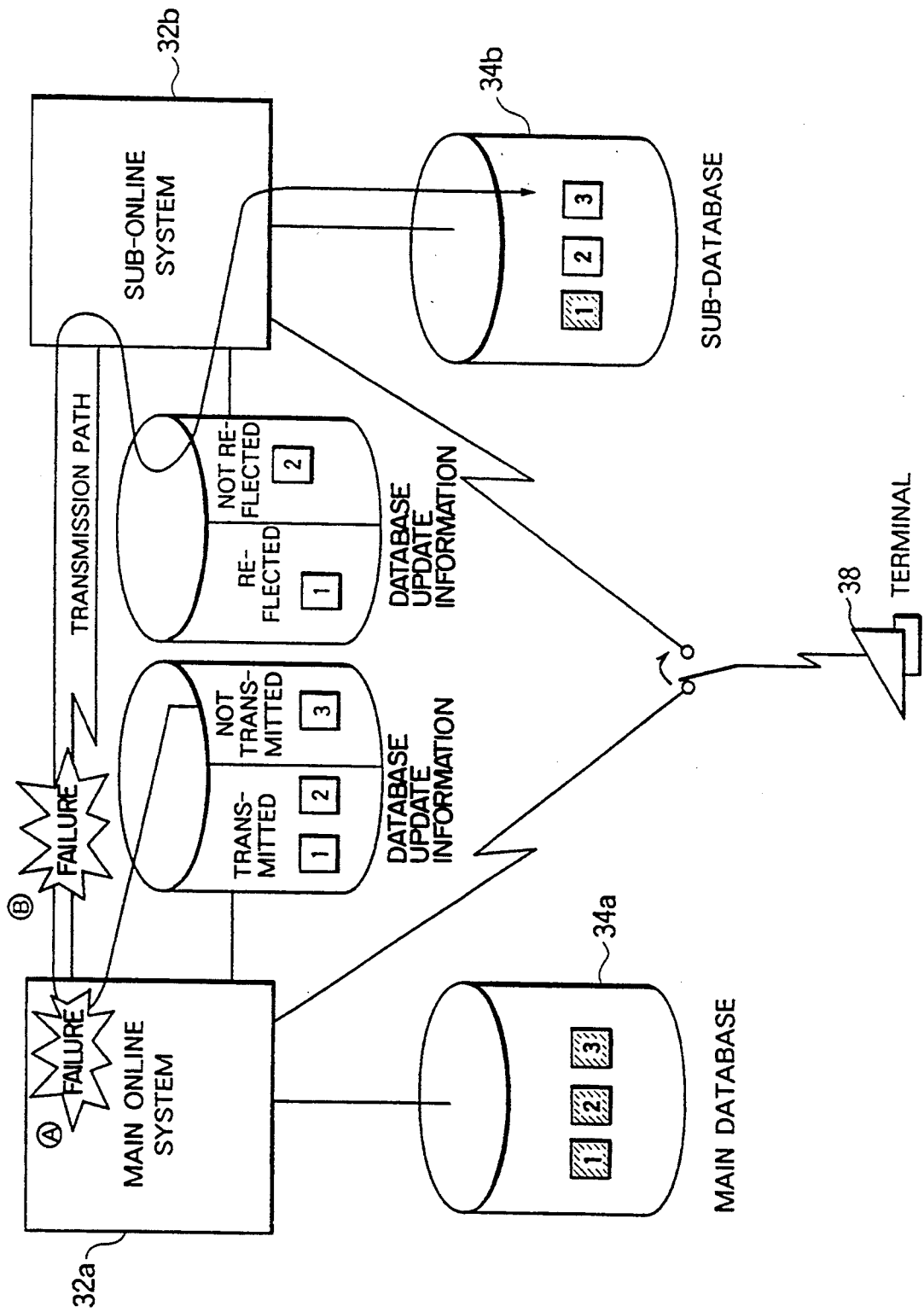
FIG. 17 is a diagram showing a condition in which the main and sub databases are out of synchronism.

When the online system is changed over from the main online system 32a to the sub-online system 32b, if the main online system 32a is in failure (A in FIG. 17), or if the transmission path between the main online system and the sub-online system is out of order (B in FIG. 17), it is impossible to transmit database update information possessed by the main online system 32a, which has not been transmitted, to the sub-online system 32b, which may result in breaking the synchronization of the contents between the main database and the sub-database (FIG. 17 shows that the database update information record NO. 3 cannot be transmitted to the sub-online system 32b).

For synchronizing the contents of the main database and the sub-database in this case, it is necessary to reenter, from a terminal, transaction data corresponding to the database update information possessed by the main online system 32a which has not been transmitted. However, there is a problem that transaction data to be entered cannot be defined at each terminal. More specifically, it is possible to confirm at the terminal side whether or not an inputted transaction has been completed in the main online system 32a, however, it is not possible to confirm whether or not database update information generated by this transaction has been reflected to the sub-database 34b.

Figure 18:
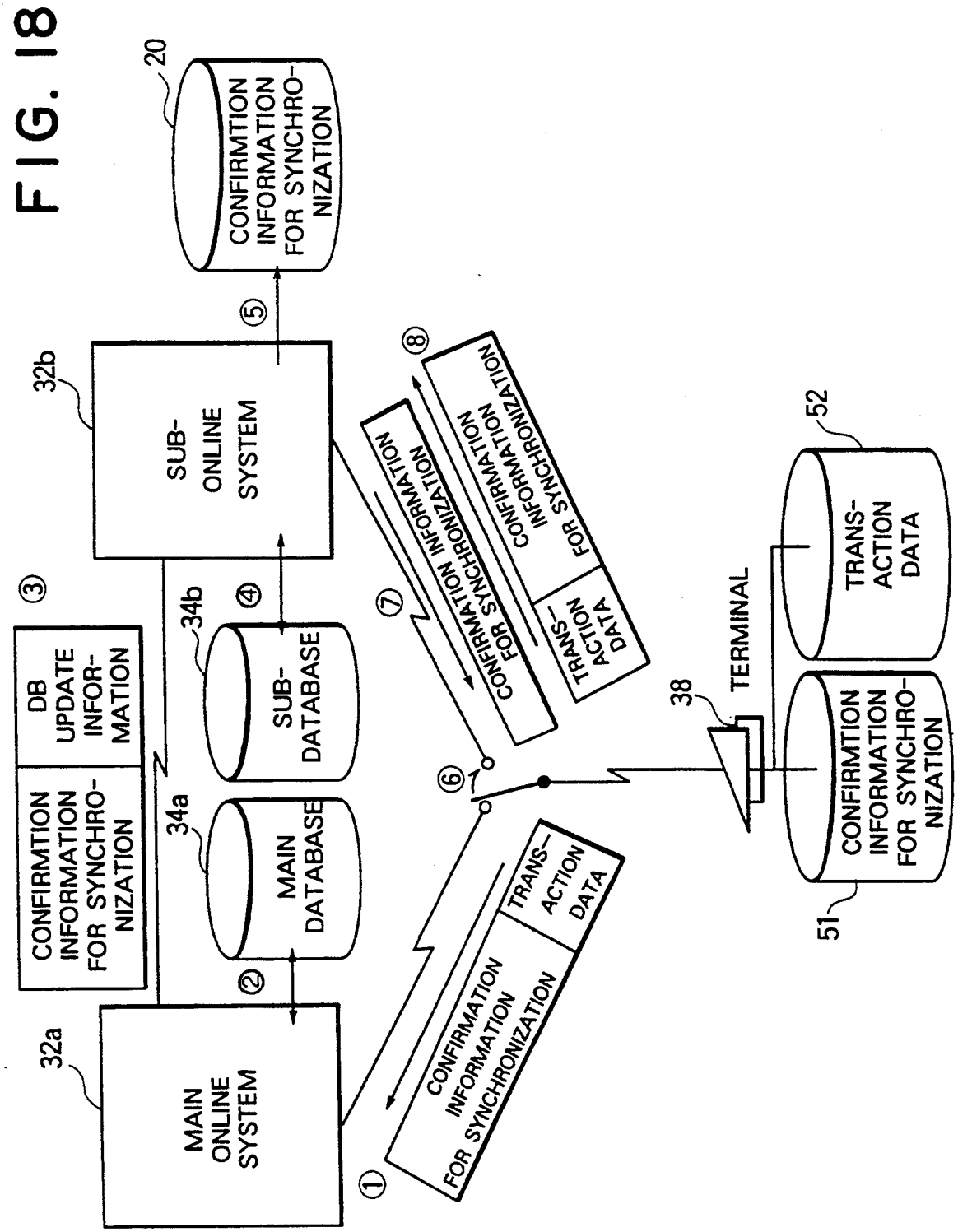
FIG. 18 is a systematic structural diagram showing the concept of another embodiment of the present invention.

Next, an outline of a synchronization control between the main databases and the sub-database will be explained with reference to a conceptual diagram shown in FIG. 18.

When a transaction is inputted from the terminal 38, confirmation information for synchronization (a terminal number and a transaction sequence number) and transaction data are stored in external storage units 51, 52 disposed in the terminal 38 and then transmitted to the main online system 32a (①).

The main online system 32a, after updating the main database 34a (②), transmits database update information and the confirmation information for synchronization to the sub-online system 32b (③). The sub-online system 32b stores the confirmation information for synchronization in an external storage unit 20 at a time when an update of the sub-database 34b is completed (④, ⑤).

When the main online system 32a is changed over to the sub-online system 32b (⑥), the confirmation information for synchronization is transmitted from the sub-online system 32b to the terminal 38 (⑦). Then, the terminal 38 compares the received confirmation information for synchronization with the one stored in the external storage unit 51. If a difference is encountered in the received confirmation information for synchronization, transactions corresponding to the difference in the transaction sequence number are read from the external storage unit 52 and inputted to the sub-online system 32b (⑧).

The above-mentioned processing is automatically performed by a communication between the terminals 38 and the sub-onlin system 32b without manipulating the terminal 38.

FIG. 19 is a systematic structural diagram showing a specific embodiment.

A transaction 55 is inputted from a terminal 38 in a business office to the main online system 32a for updating the main database 34a. The transaction is composed of confirmation information for synchronization including a terminal number and a transaction sequence number determined according to the respective terminals and transaction data. A distributed processor 54 for controlling a plurality of terminals updates the confirmation information for synchronization (the latest transaction sequence number (inputted)) stored in the external storage unit 51 and stores the transaction data in the external storage unit 52 simultaneously with transmission of the transaction to the main online system 32a (①).

The main online system 32a updates the main database 34a for executing the transaction (②), adds the confirmation information for synchronization to database update information, generates and transmits a message 56 to the sub-online system 32b provided for backup for emergency (③). When the transaction has been completed in the main online system 32a, the distributed processor 54 updates the confirmation information for synchronization (the latest transaction sequence number (completed)) stored in the external storage unit 51.

The sub-online system 32b updates the sub-database 34b on the basis of the received message 56 (④) as well as updates the latest transaction sequence number included in the confirmation information for synchronization stored in the external storage unit 20 (⑤).

When the business office system or the terminal 38 composed of the distributed processor 54 and a plurality of terminal units 53 is changed over to be connected to the sub-online system 32b from the main online system 32a due to a failure or the like in the main online system 32a (⑥), confirmation information for synchronization 57 stored in the external storage unit 20 of the sub-online system 32b is transmitted to the distributed processor 54 (⑦).

The distributed processor 54 compares the confirmation information for synchronization stored in the external storage unit 51 with the received confirmation information for synchronization 57. If there are one or more uncompleted transactions as a result of the comparison, they are taken out from the external storage unit 52 and inputted to the sub-online system 32b (⑧). In the example shown in FIG. 19, the latest transaction sequence number of the terminal number 01 is 10 in the sub-online system 32b while it is 12 in the distributed processor 54. Therefore, transactions having transaction sequence numbers 11, 12, respectively are inputted to the sub-online system 32b.

FIG. 20 is a flowchart showing the flow of processing performed by the distributed processor 54. If the latest transaction sequence number (completion) stored in the distributed processor 54 is coincident with the latest transaction sequence number received from the sub-online system 32b or if the answer to step 58 is YES, a processing for the transaction has been already completed, and therefore the execution is terminated. If both of the latest transaction sequence numbers are not coincident with each other or if the answer to step 58 is NO, a processing for the transaction has not been completed so that transaction data having sequence numbers larger than the latest transaction sequence number received from the sub-online system 32b are taken out from the external storage unit 52 and transmitted to the sub-online system (step 59).

FIG. 21 shows a data format of the confirmation information for synchronization possessed by the terminal 38 and the sub-online system 32b.

Incidentally, the latest transaction sequence number (inputted) indicates the latest transaction inputted from the terminal while the latest transaction sequence number (completed) indicates the latest transaction which has been processed by the main online system 32a. The distributed processor 54 is capable of examining whether a difference exists in the sequence number between (inputted) and (completed). If a difference is found, appropriate countermeasures will be taken.

As explained above, according to the present embodiment, it is possible to prevent omission and repetition of transactions when the main online system is changed over to the sub-online system, thereby making it possible to automatically synchronize contents of the databases between the main online system and the sub-online system.

(3) Database Recovery System

Next, a recovery system for recovering the main database or the sub-database from a failure in the online system as shown in the above described embodiment will be explained in summary with reference to conceptual diagrams shown in FIGS. 22-24.

Figure 22:
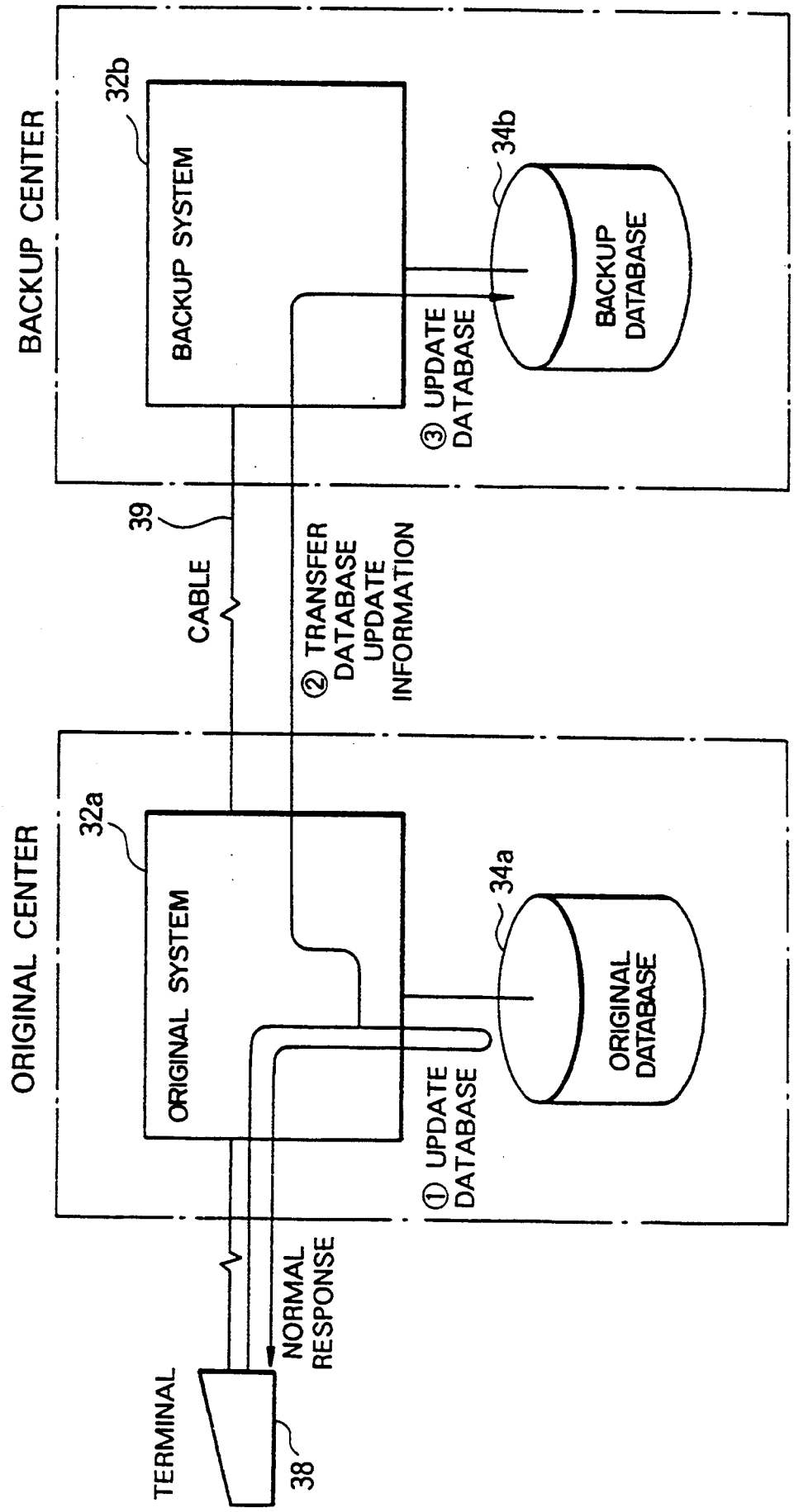
FIG. 22 is a conceptional block diagram showing a system having a backup database.

As shown in FIG. 22, a backup center having the backup system 32b and the backup databases 34b is provided in addition to an original center having the original system 32a and the original database 34a. The original system and the backup system are connected with each other by a cable 39 or the like. Every time the original database is updated due to processing of transaction data inputted from a terminal 38 or the like in the original system (①), database update information is transferred to the backup system in real time (②) to update the backup database (③), whereby a real time backup database is generated.

Figure 23:
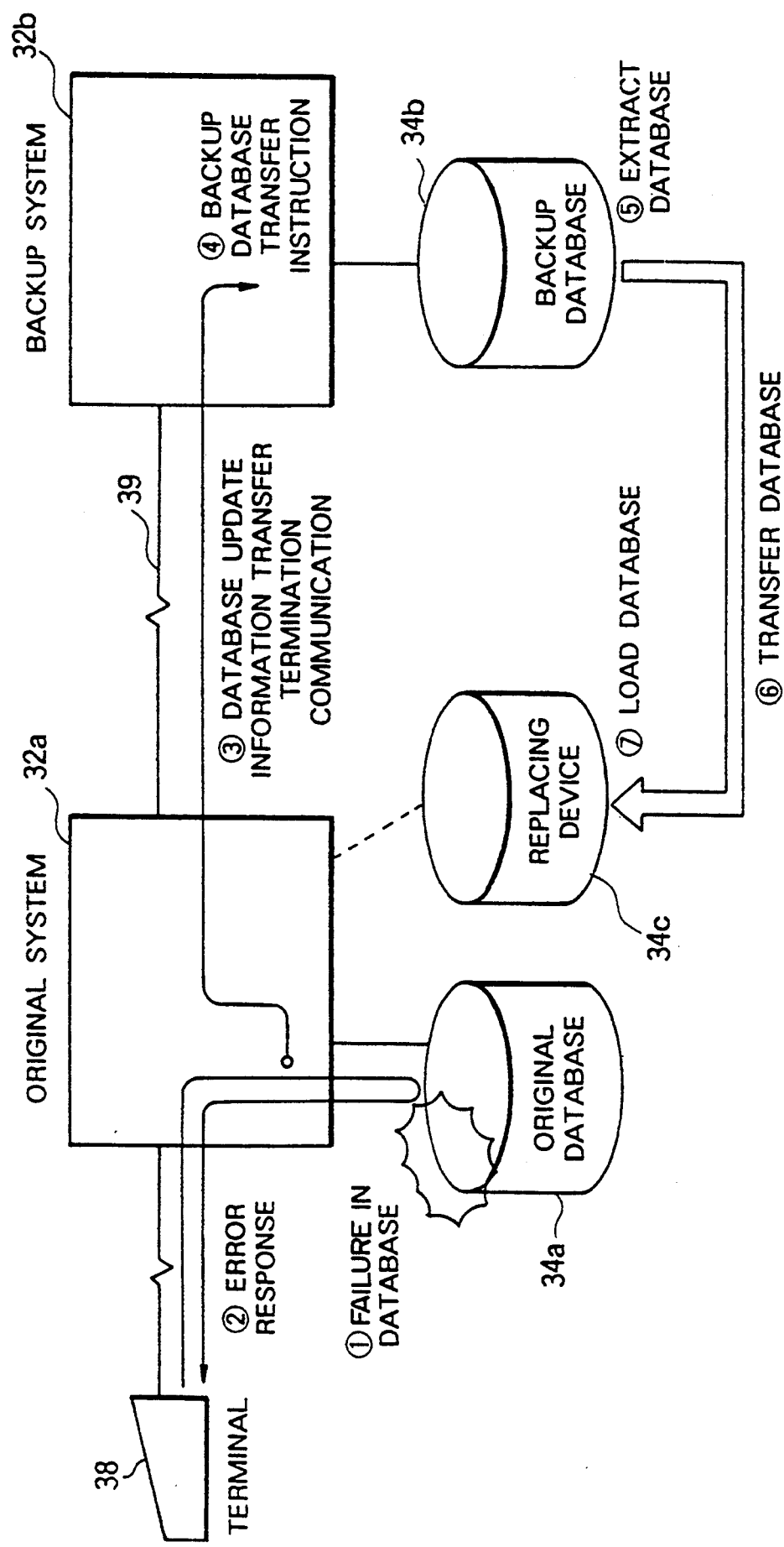
FIG. 23 is a conceptional block diagram showing a recovery method which is utilized when the original database is impeded by a failure.

FIG. 23 shows a recovery system for recovering the original database from a failure. If a failure or fault is detected in the original database 34a (①) in course of updating the original database by processing transaction data inputted from the terminal 38 or the like in the original system 32a, an access request to the troubled database is treated as an error after the detection of the failure, and therefore a response indicative of an error is delivered to the terminal 38 (②). At the time when the failure in the original database is detected, a message indicating the termination of a database update information transfer is transmitted from the original system 32a to the backup system 32b (③). Then, the backup system 32b, after confirming that the database update information has all been reflected to the backup database 34b, instructs a transfer of the backup database (④). The backup system 32b extracts the backup database 34b (⑤) and transfers the same to the original system 32a (⑥). The backup database 34b is loaded into a replacing device 34c (⑦) to thereby recover the original database 34a.

Figure 24:
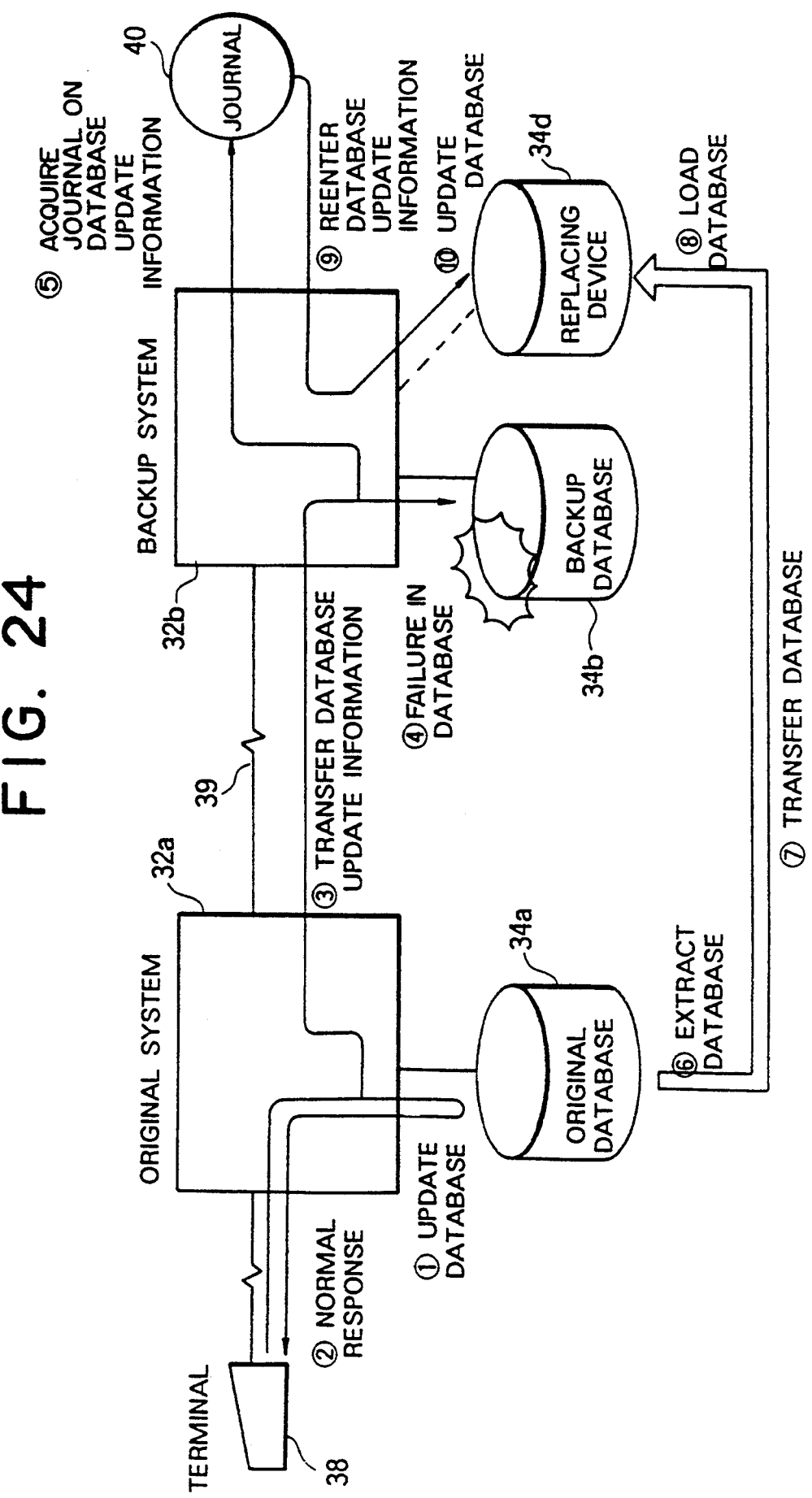
FIG. 24 is a conceptional block diagram showing a recovery method which is utilized when the backup database is impeded by a failure.

FIG. 24 shows a recovery system for recovering the backup database from a failure. The original database 34a has been normally updated by processing transaction data inputted from the terminal 38 or the like in the original system 32a (①), and a response indicative of normal processing is delivered to the terminal 38 (②), which leads to transferring database update information to the backup system 32b (③). It is assumed that a failure is detected in the backup database 34b when the backup system 32b is about to update the backup database 34b on the basis of the received database update information (④). For database update information which could not be reflected to the backup database 34b due to the failure, a journal 40 is acquired (⑤). The original system 32a continues the update processing for the original database 34a after the failure has occurred in the backup database 34b, and the database update information is transferred to the backup system 32b every time the update processing is performed, so that the database update information is acquired in the backup system 32b until the backup database 34b is recovered from the failure. The original system extracts the original database 34a (⑥), transfers the same to the backup system 32b (⑦), and loads the same into the replacing device 34d in the backup system 32b (⑧). Since updated contents of the original database 34a after the extraction of the original database 34a is not reflected to the repalcing device 34d at the time of loading, the database update information which has acquired the journal 40 during the failure in the backup database 34b is again inputted to the backup system 32b (⑨), and the database loaded into the replacing device 34d is updated ( 10 ), whereby the backup database 34d is recovered.

Next, specific embodiments will be explained with reference to FIGS. 25-28.

Figure 25:
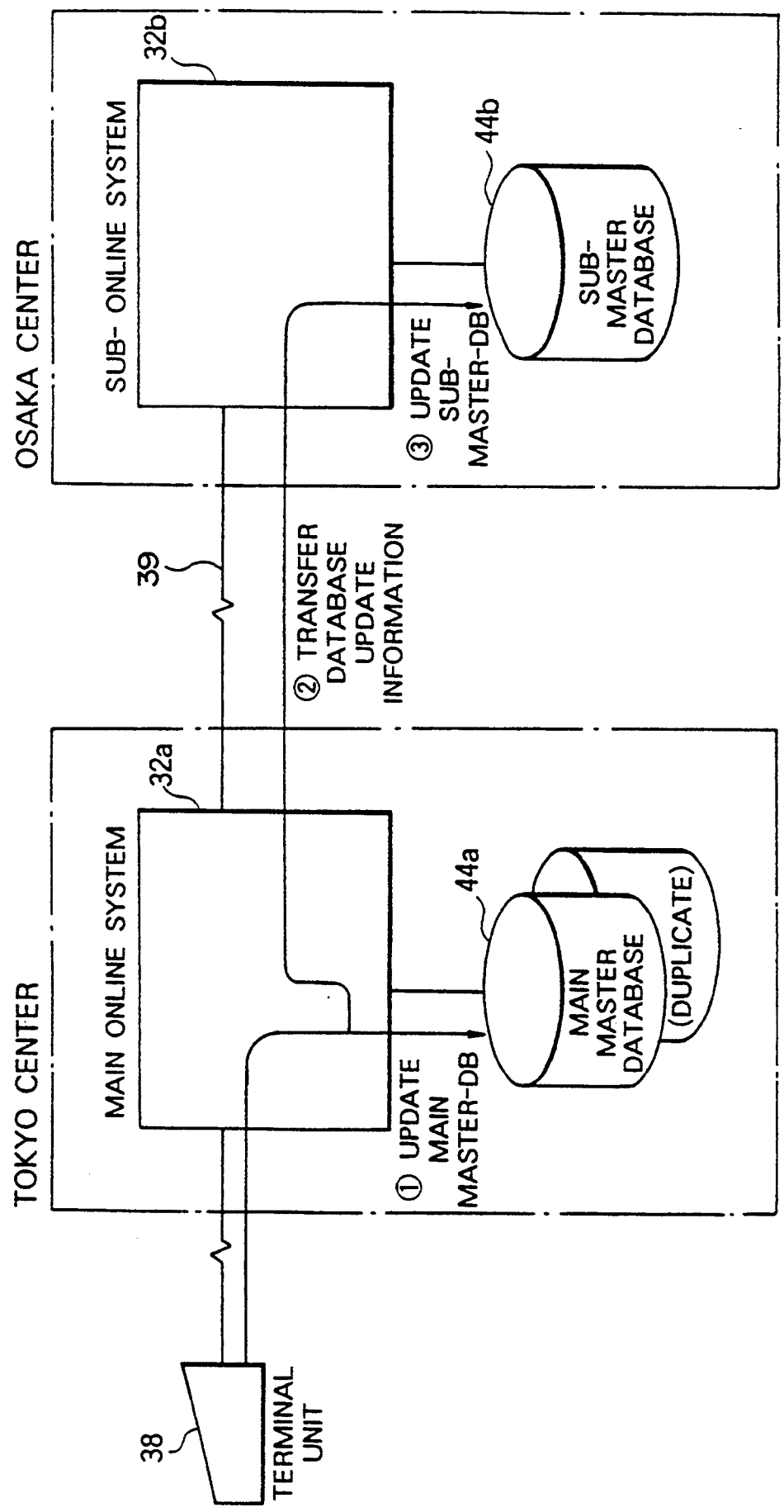
FIG. 25 is a systematic structural diagram showing a further embodiment of the present invention.

FIG. 25 is a systematic structural diagram showing the present embodiment, wherein Tokyo center has a main online system 32a and a duplicate main master-DB 44a while Osaka center is provided with a sub-online system 32b and sub-master-DB 44b. In the Tokyo center, transaction data inputted from a terminal unit 38 connected to the main online system 32a is processed, the main master-DB 44a is updated (①), and database update information is reflected to the sub-online system 32b (②). The sub-online system 32b updates the sub-master-DB 44b on the basis of the received database update information (③).

Figure 26:
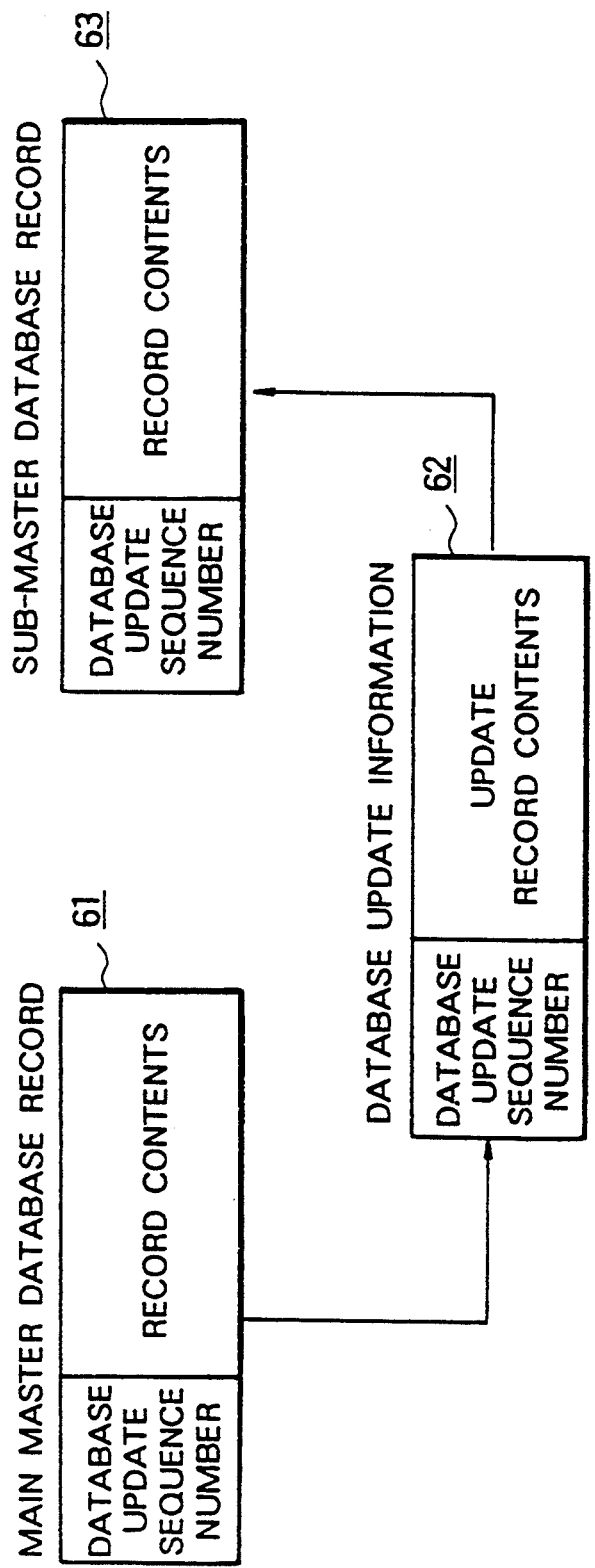
FIG. 26 is a diagram showing data formats for a database record and database update information in the embodiments.

FIG. 26 is a schematic diagram showing structures of a database record and database update information. A main master database record 61 has record contents and a database update sequence number which is counted up or incremented by one every time the database record is updated. Database update information 62 has record update contents and a database update sequence number (the same value as that of the main master database record). A sub-master database record 63 has record contents and a database update sequence number which are both updated by the same contents as the database update information.

Figure 27:
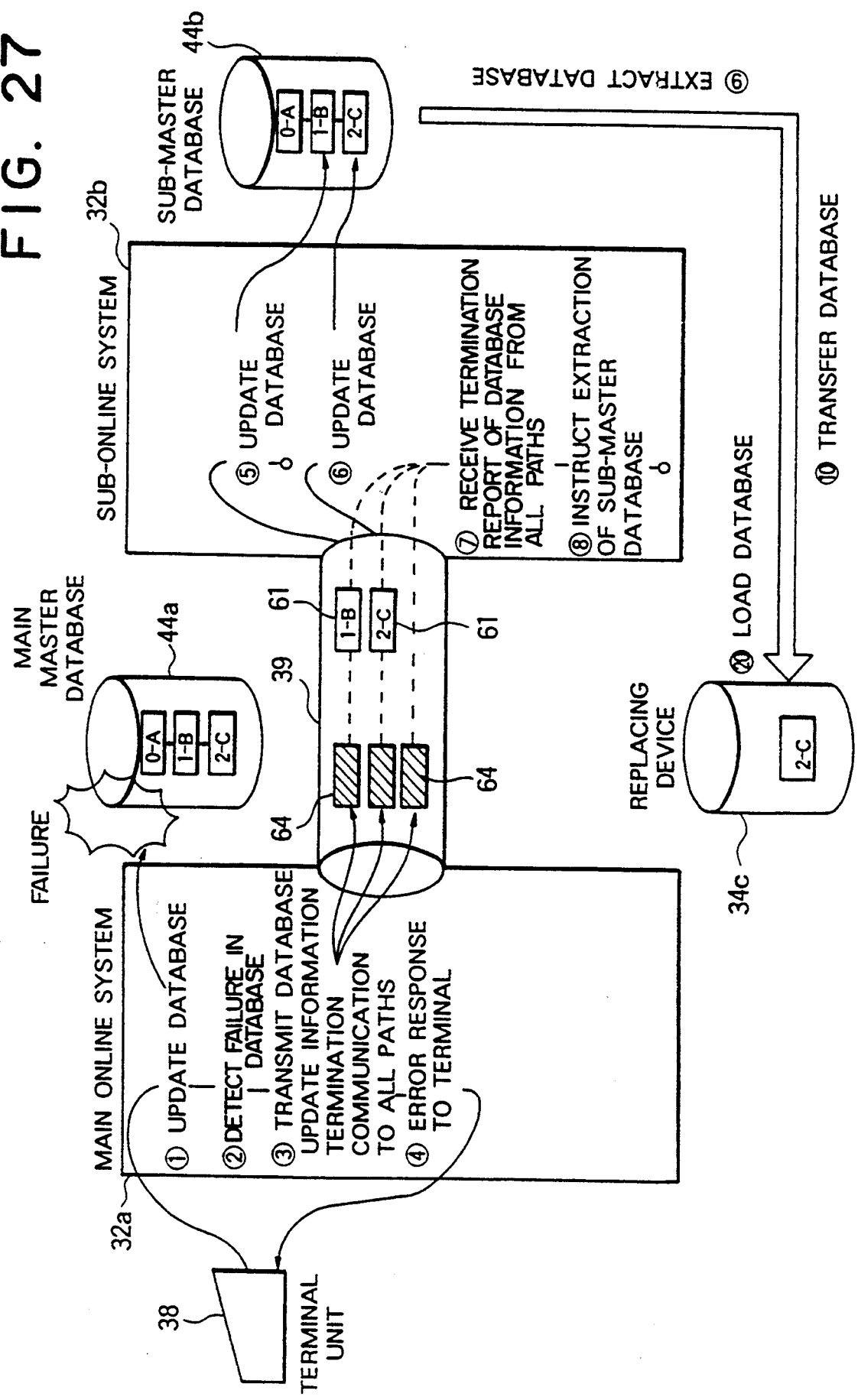
FIG. 27 is a diagram showing a recovery procedure, executed in the embodiments, when the main master database suffers from a disaster.

FIG. 27 shows a procedure of recovering the main master-DB 44a from a failure. If a failure in the database is detected (②) when the main master-DB 44a is being updated by transaction data inputted from the terminal 38 connected to the main online system 32a (①), a message 64 indicating the termination of a database update information transfer is transmitted to all the paths (③), which are multiplexed for improving the transmission efficiency, and a response indicative of an error is transmitted to the terminal 38 (④). The sub-online system 32b updates the sub-master-DB 44b on the basis of the received database update information 61 (⑤, ⑥). The sub-online system 32b, after confirming that the database update information has been reflected to the sub-master-DB 44b by receiving the message 64 indicating the termination of a database update information transfer from all the multiplex paths (⑦), instructs extraction of the sub-master-DB 44b (⑧). Then the sub-master-DS 44b is extracted to the sub-online system 32b (⑨), transferred to the main online system 32a ( 10 ) and loaded into the replacing device 34c in the main online system 32a, whereby recovery of the main master-DB 44a is completed.

Figure 28:
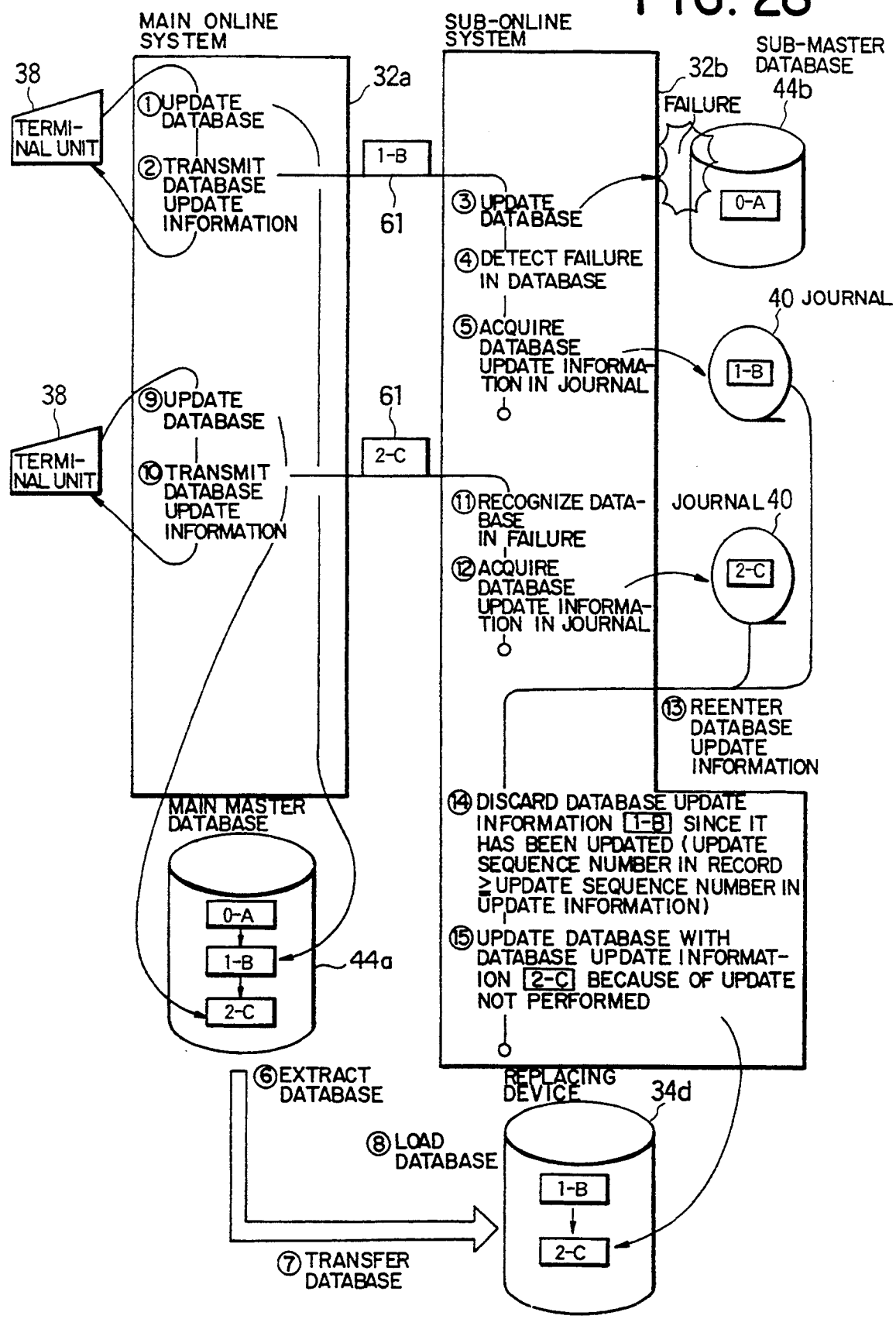
FIG. 28 is a diagram showing a recovery procedure, executed in the embodiments, when the sub-master database suffers from a disaster.

FIG. 28 shows a procedure of recovering the sub-master-DB 44b from a failure. The main master-DB 44a is updated by transaction data inputted from the terminal unit 38 connected to the main online system 32a (①), and database update information is transmitted (②). The sub-online system 32b detects a failure in the sub-master-DB 44b (④) when the sub-master-DB 44b is being updated by the received database update information 61 (1-B) (③) and acquires a journal 40 in which the database update information is stored (⑤). Then, the main online system 32a extracts and transfers the main-master-dB 44a (⑥) which is loaded into the replacing device 34d in the sub-online system 32b. The main online system 32a updates the main master-DB 44a by transaction data inputted from the terminal 38 after the extraction of the main master-DB 44a (⑨) and transmits the database update information 61 to the sub-online system 32b ( 10 ). Since the received database update information 61 (2-C) has already recognized that the sub-master-dB 44b is in failure ( 11 ), the sub-online system 32b stores the database update information 61 (2-C) in the journal 40 ( 10 ). The sub-online system 32b, after loading the database into the replacing device 34d, reenters a set of the database update information 61 which have been acquired in the journal 40 ( 13 ) and updates the database stored in the replacing device 34d. However, since the database in the replacing device 34d has been updated by the database update information 61 (1-B) (the database update sequence number of the database record is equal or larger than the database update sequence number of the database update information), the information 61 (1-B) is discarded ( 14 ). Since the database in the replacing device 34d has not been updated by the database update information 61 (2-C) (the database update sequence number of the database record is less than the database update sequence number of the database update information), a database update is performed ( 15 ), whereby the recovery of the sub-master-DB 44b is completed.

Figure 29:
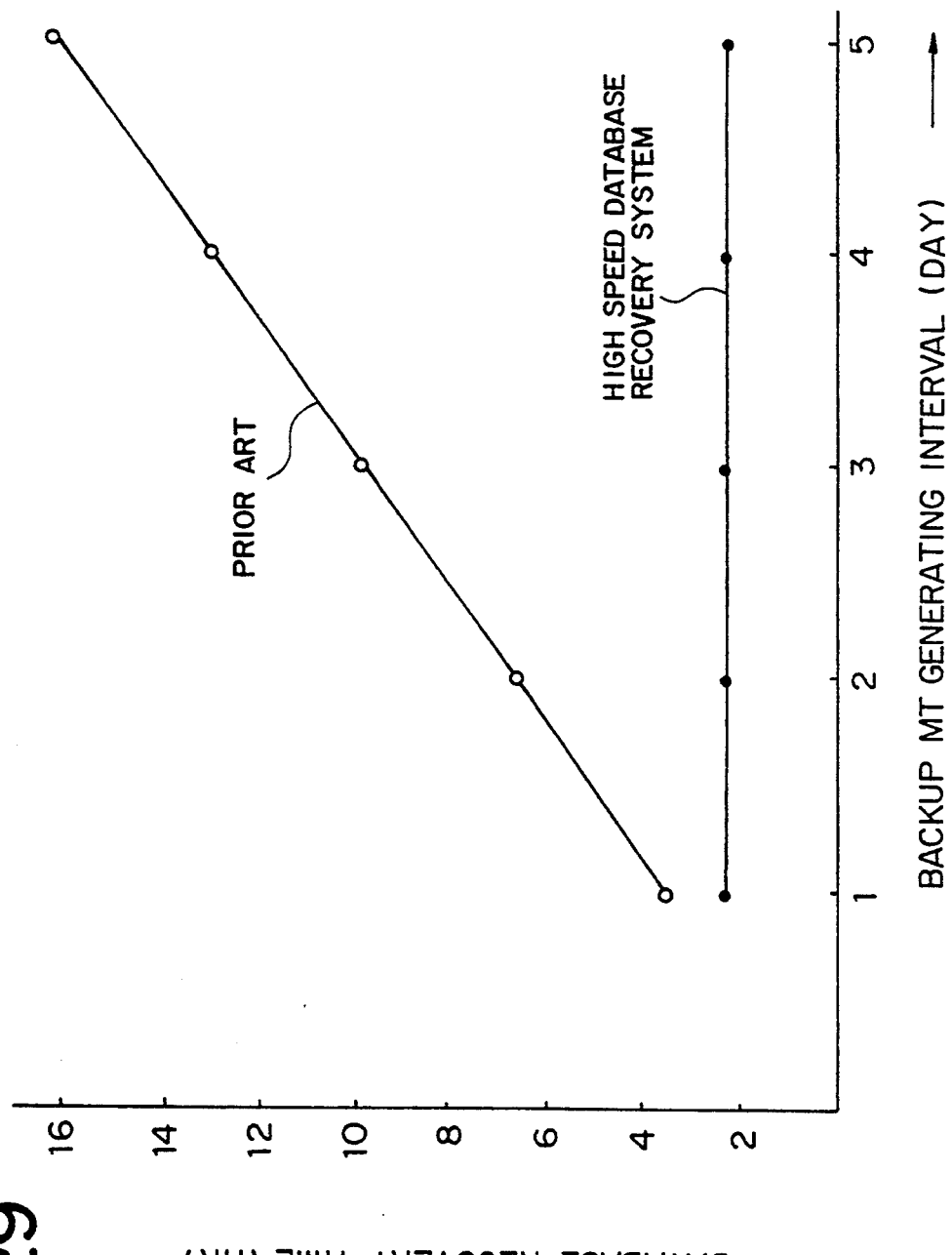
FIG. 29 is a graph used for comparing time periods required to recover the database between the prior art and the present invention.

As explained above, according to the present embodiment, a real time backup database is produced in the backup center, thereby rendering it possible to reduce an application load necessary to produce a backup MT and recover duplicate database systems in a short time from a failure which damages both systems due to a disaster or the like. Also, a damaged database can be recovered in a shorter time by mutually utilizing the original database and the backup database. FIG. 29 is a graph showing a relationship between a time interval at which a backup MT is produced and a database recovery time in the prior art. It can be understood from FIG. 29 that the database recovery time is increased as the backup MT producing time interval is longer in the prior art, while the high speed database recovery system can recover the database in a constant short time irrespective of the backup MT producing interval.

(4) Database Management System

In the online system as shown in the above-mentioned embodiment, the integration of the main database with the sub-database will be investigated.

In the foregoing online system, for integrating the main database and the sub-database after updating both databases with different contents respectively in the original system and the backup system in parallel, both the databases are integrated by mutually exchanging and reprocessing all transaction data processed in the respective computer centers, which results in requiring an extremely long time for integration.

Also, for ensuring the update order of the main database and the sub-database, all transaction data in the original system and the backup system are merged in time series and thereafter processed collectively, so that database integration will take a long time. The above problems may be summarized in the following manner:

(1) There is no means for discriminating records which have been parallelly updated in the main database and the sub-database and those which have been individually updated, so that if all transaction data is to be reprocessed, database integration processing will take a long time.

(2) If all transaction data in the original system and the backup system are merged and then reprocessed for ensuring the order of records parallelly updated in the main database and the sub-database, database integration processing will take a long time.

A specific embodiment for solving the above problems will hereinafter be explained.

Figure 36:
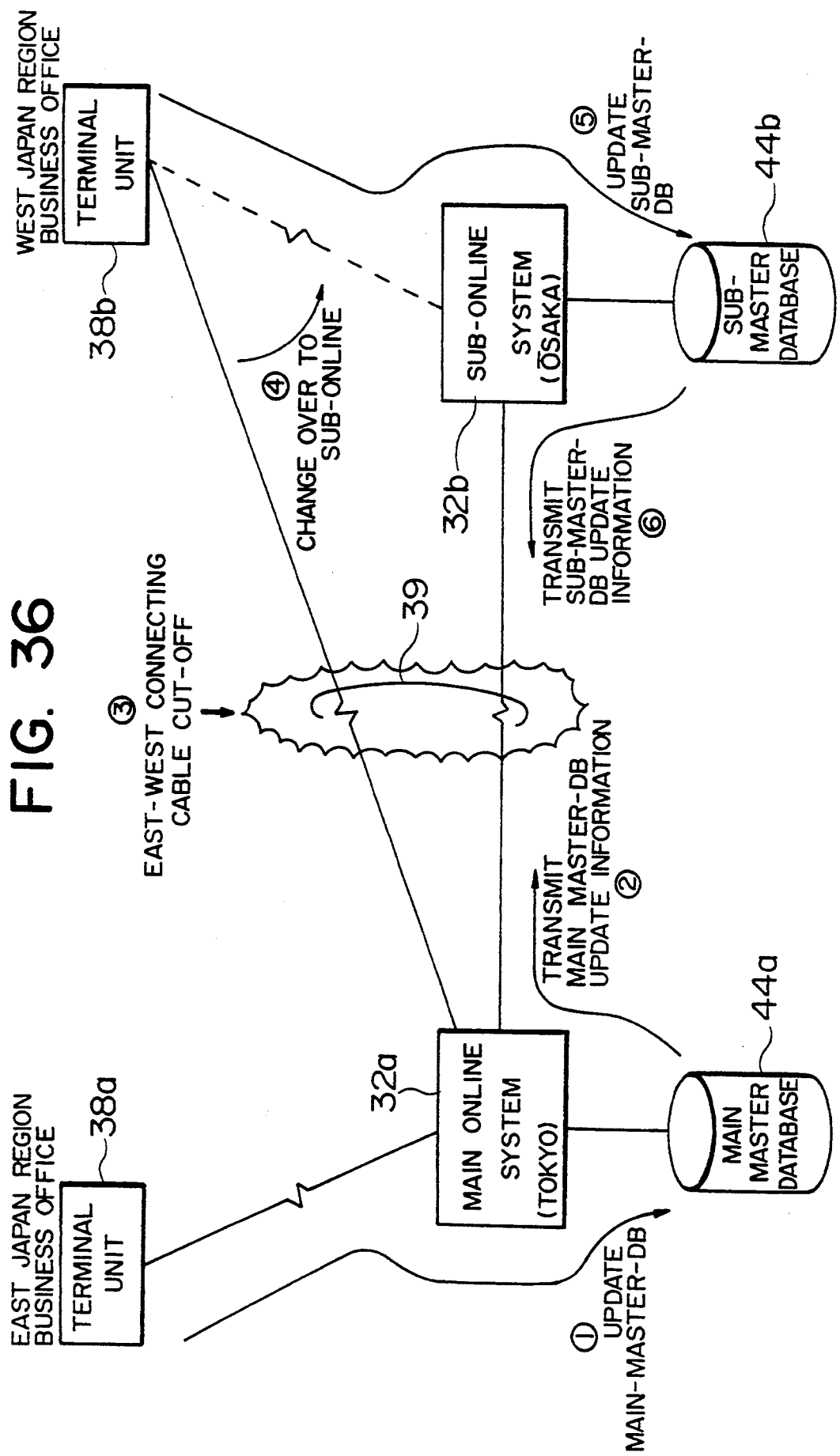
FIG. 36 is a block diagram showing an embodiment for practicing the present invention in a bank online system.

FIG. 36 shows an embodiment which is implemented in a bank online system. A main online system 32a is established in Tokyo while a sub-online system 32b is established in Osaka as a backup system therefor. In a normal operation, a terminal unit 38a disposed in an east Japan region business office and a terminal unit 38b in a west Japan region business office are both connected to the main online system 32a, wherein the main master-DB 44a is updated ((①)), main master-DB update information is transmitted to the sub-online system 32b ((②)), and the sub-master-DB 44b is updated to thereby coincide the main master-DB 44a with the sub-master-DB 44b.

If an east and west connecting cable 39 is cut due to a disaster ((③)), the terminal 38b in the west Japan region business office cannot be connected to the main online system 32a located in Tokyo, whereby transactions are disabled. Then, the terminal unit 38b in the west Japan region business office is changed over for connection with the sub-master-DB 44b ((4)), wherein transactions are performed to update the sub-master-DB 44b ((5)) as well as transmit update information of the sub-master-DB 44b to the main online system 32a ((6)). The terminal unit 38a in the east Japan region business office, in turn, continues transactions with the main online system 32a, wherein the main master-DB 44a is updated, and update information is transmitted to the sub-online system 32b ((7)).

When the east and west connecting cable 39 is recovered, update information of the sub-master database 44a is received by the main online system 32a and reflected to the main master-DB 44b to thereby integrate the sub-master-DB 44b with the main master-DB 44a. Similarly, update information of the main master-DB 44a is received by the sub-online system 32b and reflected to the sub-master-dB 44b to integrate the main master-DB 44a with the sub-master-DB 44b. Thereafter, the terminal unit 38b in the west Japan region business office is connected again to the main online system 32a to restore the normal operation for performing transactions.

Figure 37:
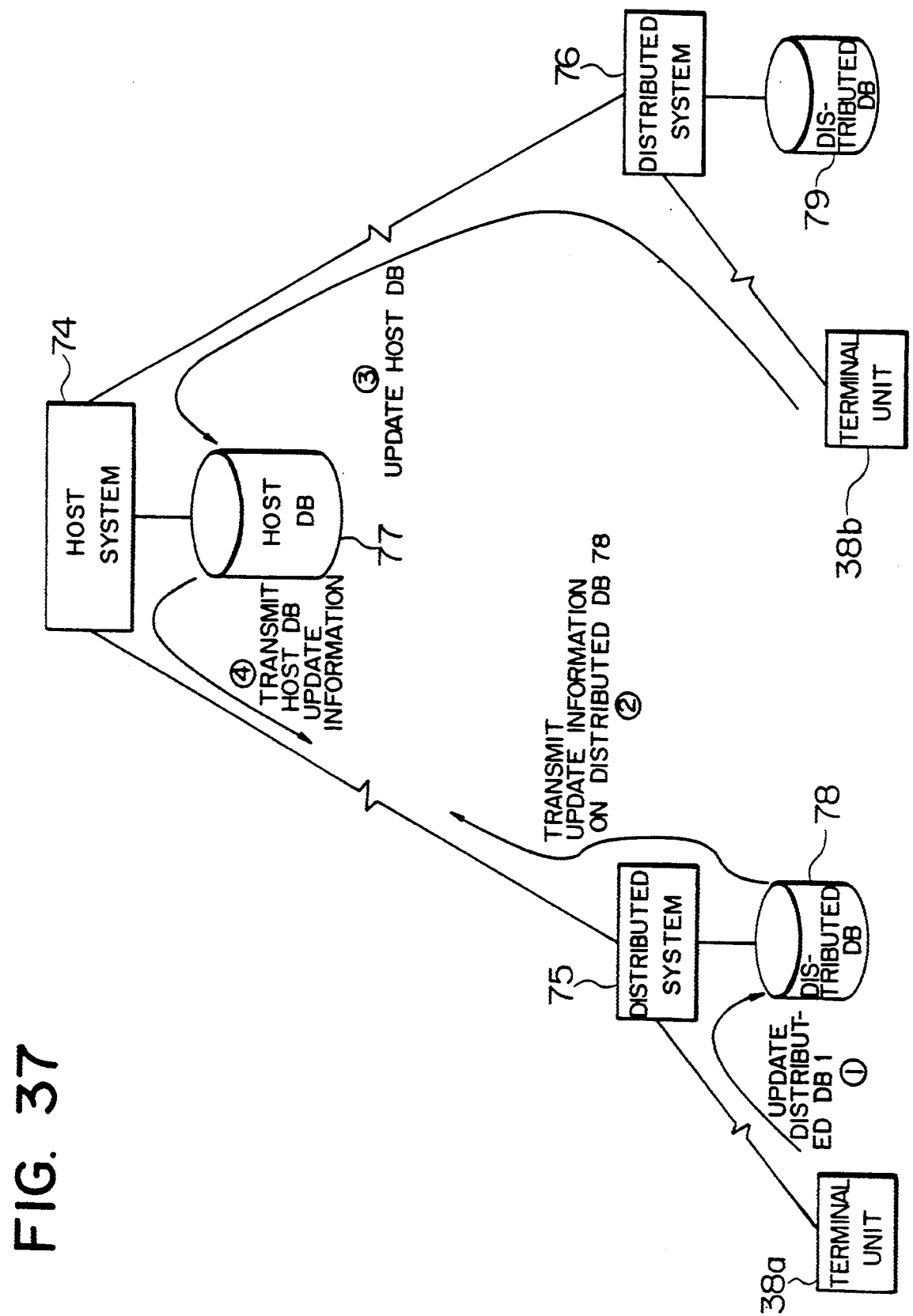
FIG. 37 is a block diagram showing an embodiment for implementing the present invention in a distributed system.
Figure 38:
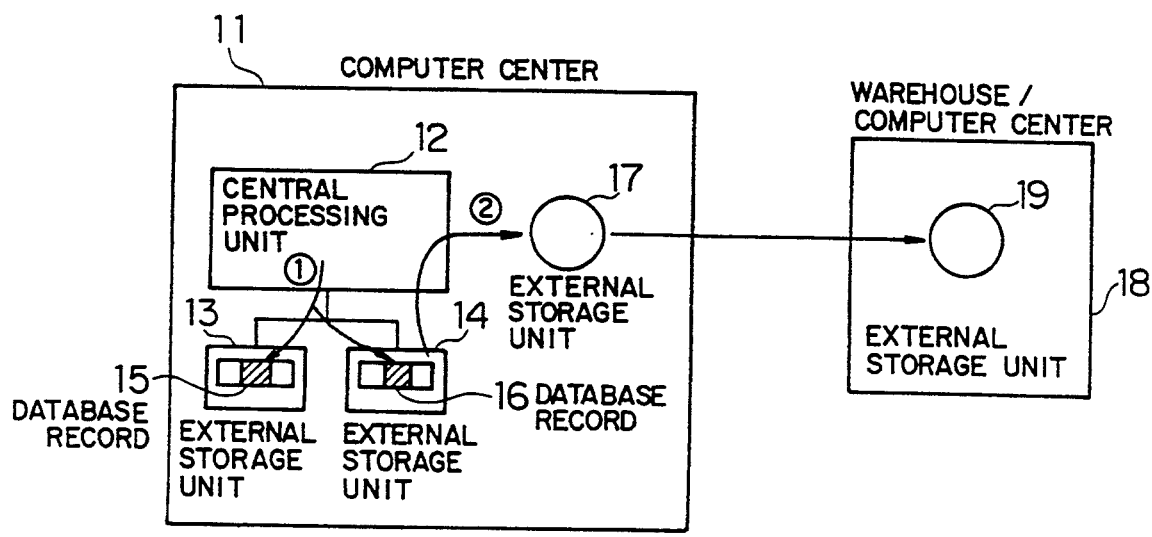
FIG. 38 is a block diagram showing a prior art system.
Figure 39:
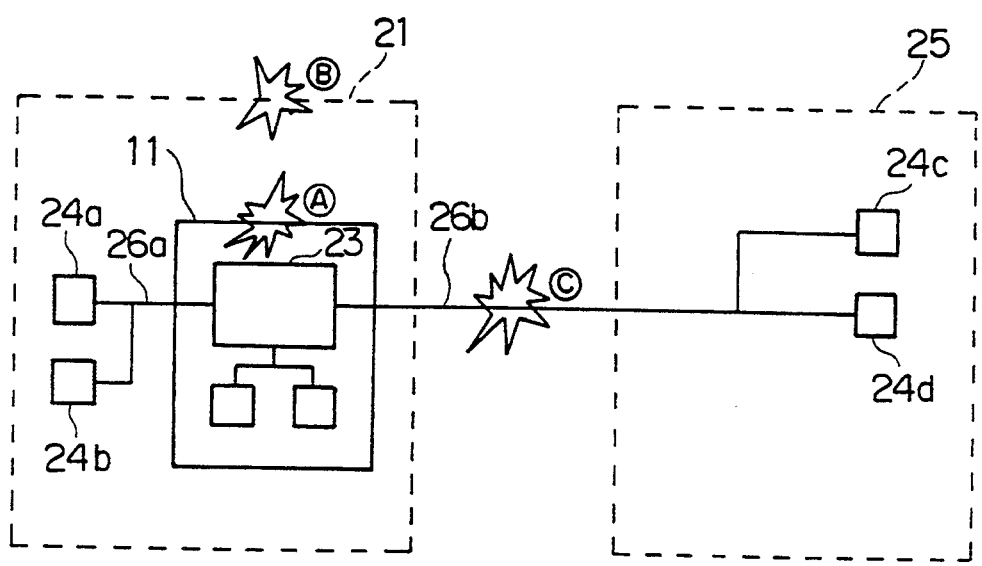
FIG. 39 is a block diagram showing problems implied in the prior art system.

FIG. 37 shows an embodiment for practicing the invention in a distributed system. An overall system is formed by connecting a host system 74 with a plurality of distributed systems 75, 76. The host system 74 has a host database 77 for storing the same contents as all the distributed databases. The distributed systems 75, 76 have distributed databases 78, 79, respectively, for storing information relative to the respective distributed systems.

The distributed database 78 is updated by transactions from a terminal unit 38a ((1)), and update information is transmitted to the host system 74 ((2)). In the host system 74, the update information is reflected to concerned records in the host database 77 to thereby perform database integration for coinciding contents of the distributed database 78 with the host database 77.

Since transactions from the terminal unit 38b update records which do not exist in the distributed database 79, the host databae 77 is updated by the host system 74 ((3)). The updated records must be stored in the distributed database 78, so that update information is transmitted to the distributed system 75 ((4)) and reflected to concerned records in the distributed database 78 by the distributed system 75, whereby database integration is performed for coinciding the contents of the host database 77 with the distributed database 78.

The explanation below is applied to both the host database 77 and the distributed database 78 if the former is regarded as a main database while the latter as a sub-database.

Next, the present embodiment will hereinafter be explained in detail.

Figure 31:
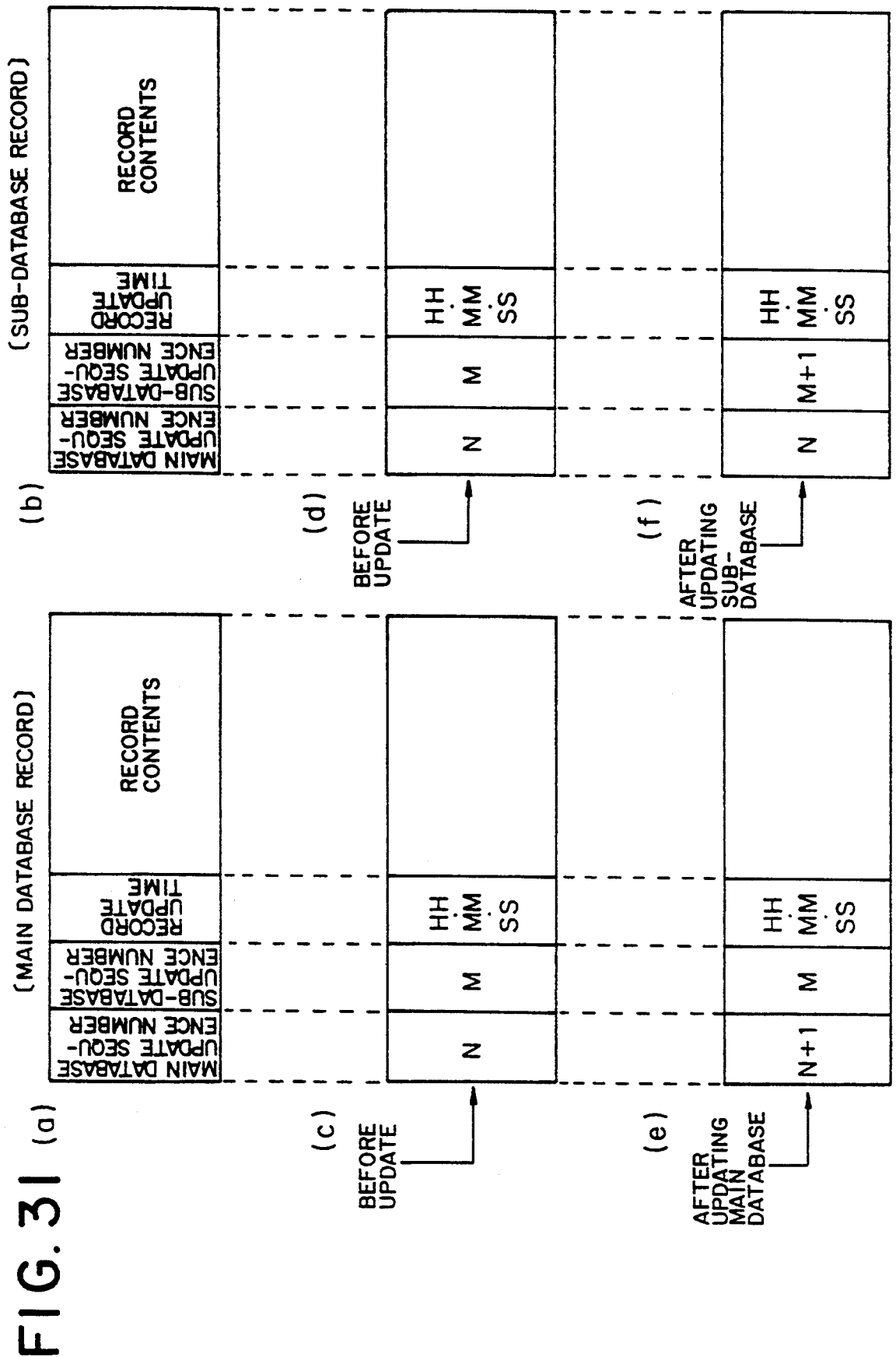
FIGS. 31(a) to 31(f) are diagrams showing database record formats.

FIG. 31 shows a data format of records stored in the main database and the sub-database. As shown in the drawing, each database record stored in the main database and the sub-database has a main database update sequence number, a sub-database update sequence number and a record update time (a), (b).

In an initial condition (before update), the main database record and the sub-database record respectively have a main database update sequence number and a sub-database update sequence number presenting the identical number (c), (d).

In main database update processing, the main database update sequence number of the main database record is incremented by one, and the record update time of the same is set in the form of HHMMSS (e).

In sub-database update processing, the sub-database update sequence number of the sub-database record is incremented by one, and the record update time is set in the same manner (f).

As shown in FIG. 32, in database integration processing for integrating the sub-database with the main database, additional information comprising sub-database update information, the input terminal name, a transaction data sequence number and inputted transaction data is transmitted from the sub-database to the main database.

Figure 30:
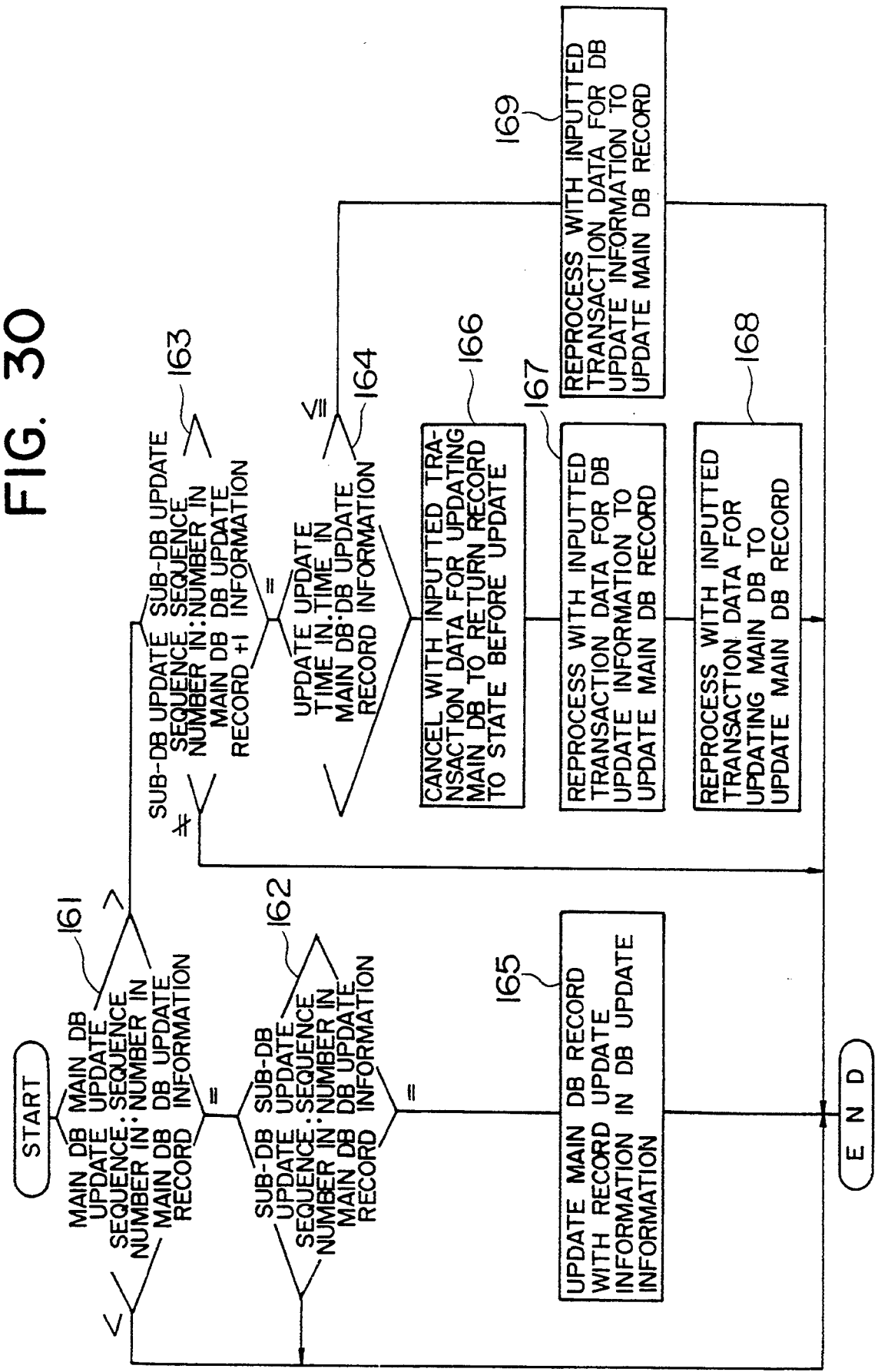
FIG. 30 is a flowchart showing a procedure of reflecting database update information to the database.

FIG. 30 shows a flowchart of processing for reflecting sub-database update information to the main database. Received sub-database update information is compared with the main database update sequence number and the sub-database update sequence number of the main database record (at steps 161, 162, 163). If the sub-database update information shows that only records in the sub-database have been individually updated, the sub-database update information is reflected as it is to the main database record (at step 165). Contrarily, if parallelly updated records are encountered, the record update time is compared (at step 164), and inputted transaction data for database update is reprocessed while observing the update order of the database records (at steps 166, 167, 168, 169).

Figure 33:
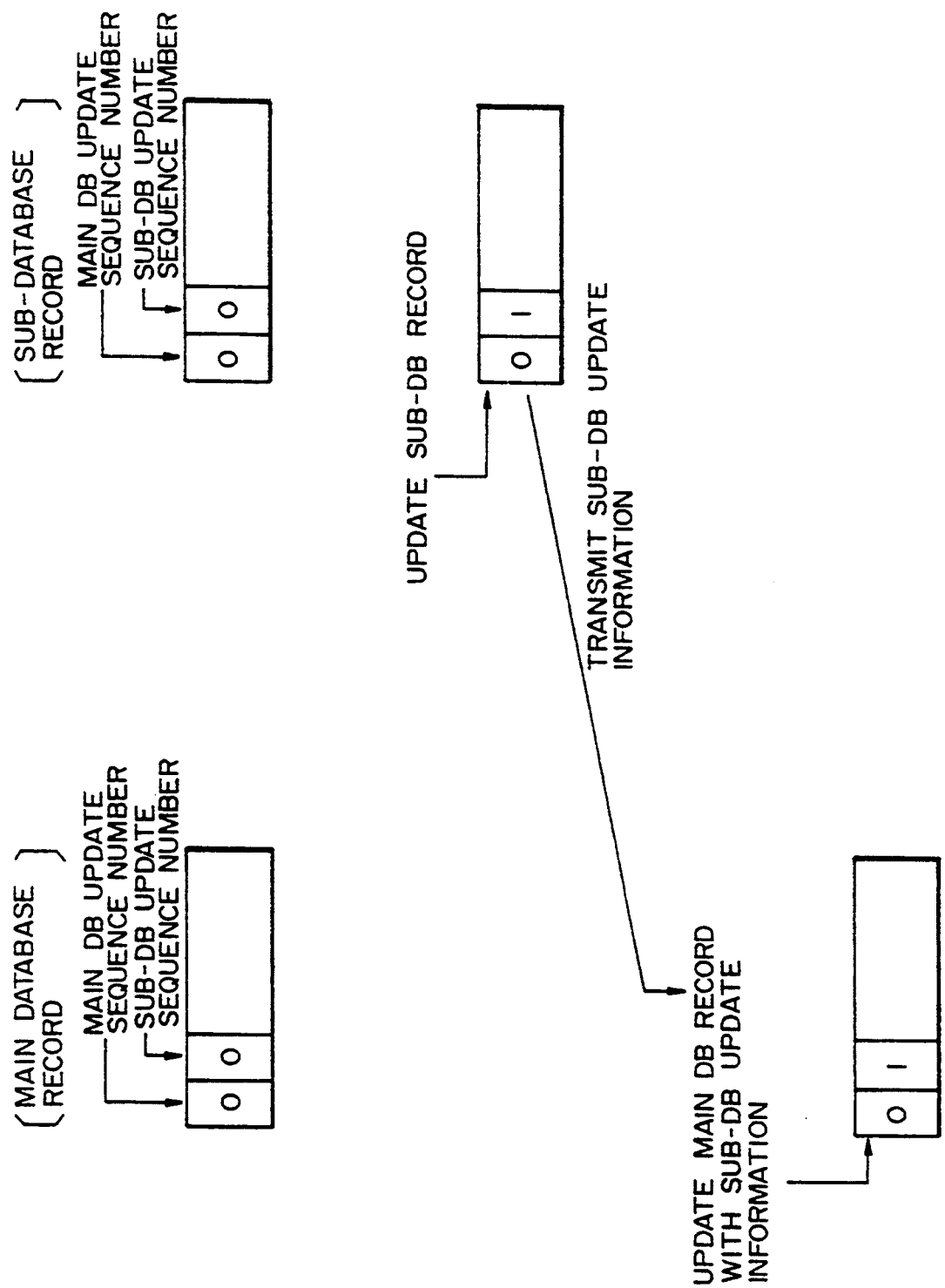
FIG. 33 is a state transition diagram of the database records showing a case where the sub-database records have been solely updated.

FIG. 33 shows a state trnsition of a database record when sub-database records only have been updated (individual update).

Figure 34:
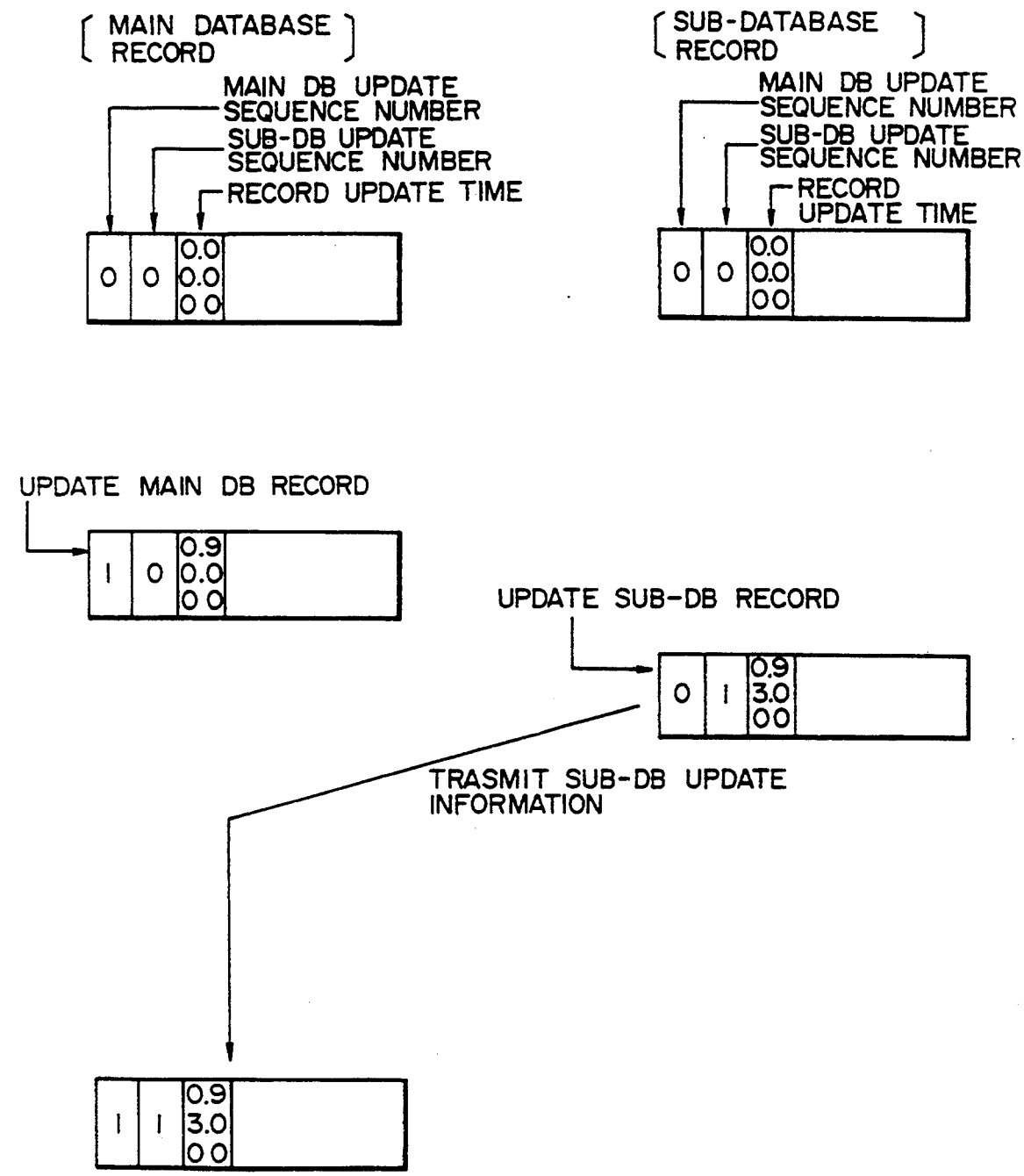
FIG. 34 is a state transition diagram of the database records showing a case where a record in the main database is updated prior to an update of a record in the sub-database.

FIG. 34 shows a state transition of a database record when the main database records have been updated prior to updating the sub-database. In this case, the main database and the sub-database are both updated, however, since the sub-database is updated after the main database, the main database records are reprocessed and updated by inputted transaction data for updating the sub-database.

Figure 35:
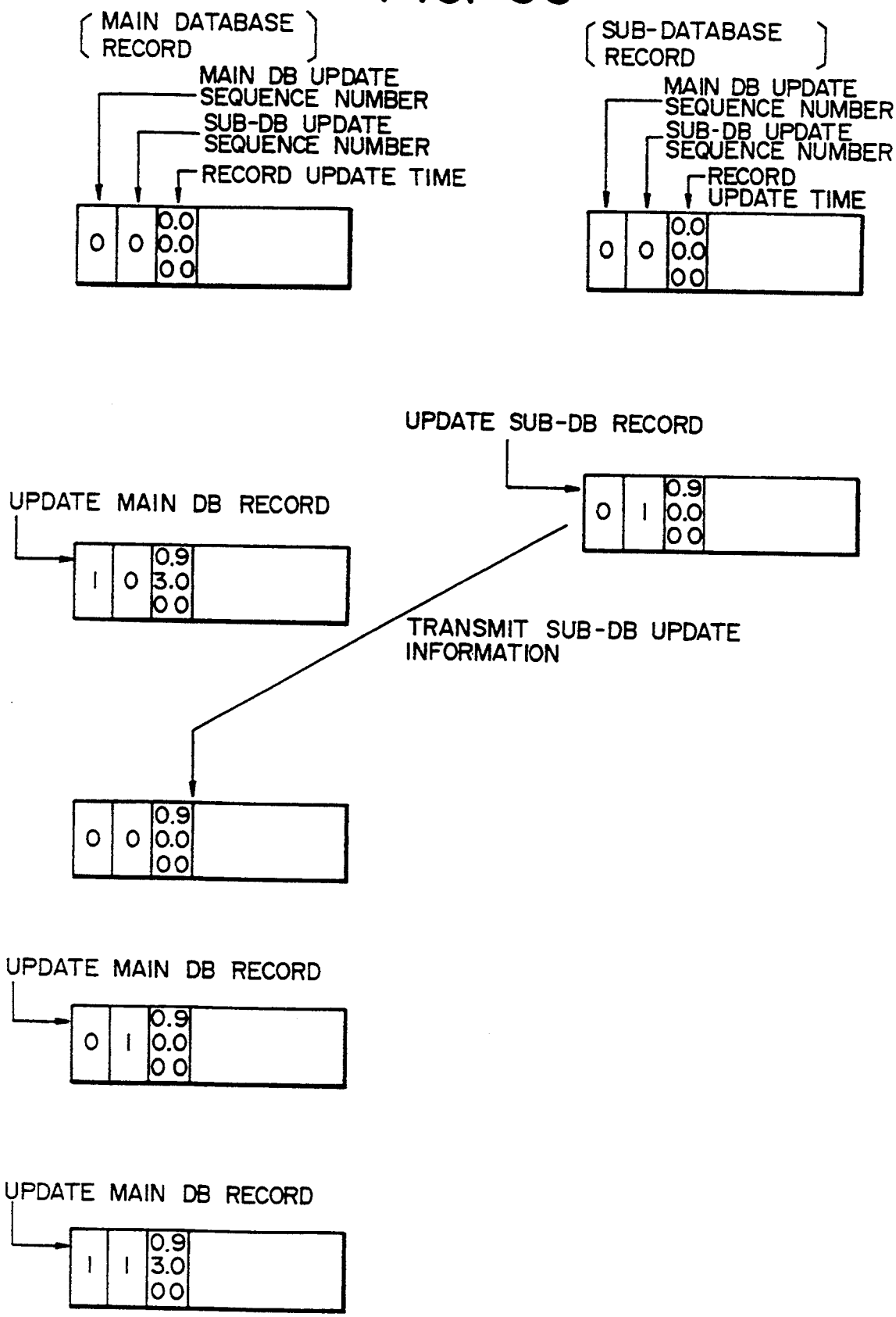
FIG. 35 is a state transition diagram of the database records showing a case where a record in the main database is updated after a record in the sub-database has been updated.

FIG. 35 shows a state transition of a database record when the main database record has been updated after updating the sub-database. The main database and the sub-database are both updated, however, since the main database is updated after updating the sub-database, the update of the main database is cancelled by inputted data for updating the main database to return the main database record in the state before the update processing. Next, the main database record is reprocessed by inputted data for updating the sub-database record to be updated and finally reprocessed by inputted data for updating the main database to be updated.

Next, a consideration will be made to a case where main database records or sub-database records have been updated plural times. When the sub-database record have been updated plural times, sub-database update information is delivered to the main online system in order of update processing and sequentially reflected to the main database, wherein each reflection processing is performed in the same manner as the case where a sub-database record is updated once. When the main database records have been individually updated plural times without the sub-database, reflection processing to the main database is not generated, thereby incurring no problem. When the sub-database is also updated together with the main database and if such update of the sub-database is performed earlier than the main database, the reflection processing is achieved by steps 161, 163, 164, 166, 167 and 168 in the flowchart shown in FIG. 30, wherein the cancellation processing of the main database records at step 166 is performed the above-mentioned plural times, and the reprocessing of the main database updating at step 168 is also performed plural times.

It is apparent that the above-mentioned system can be applied to a case where the main database is integrated with the sub-database.

As explained above, according to the present invention, the main database update sequence number is checked with the sub-database update sequence number to discriminate parallelly updated records from individually updated records. The individually updated records are subjected to database reflection processing to reduce the amount of transaction data to be reprocessed, while the parallelly updated records are reprocessed with observance of the update order by comparing the transaction time, thereby producing effect of performing database integration for a reduced time while ensuring the update order of the database records.

We claim:

1. A highly reliable online system comprising:
an original computer center for i) updating ones of a plurality of first records in an original database on the basis of preselected first transactions inputted from terminals connected to the original computer center, the first transactions affecting the contents of said original database, and ii) multiplexedly delivering update information on updates performed to said ones of the plurality of first records in said original database, the update information including an update sequence number for each of said ones of said plurality of first records updated, the update sequence number for each of said ones of said plurality of first records updated being incremented for each update to corresponding ones of said plurality of first records by said original computer center; and
a backup computer center, coupled to said original computer center, for multiplexedly receiving said update information for updating ones of a plurality of second records related to said ones of said plurality of first records, in a backup database connected to the backup computer center and corresponding to said original database on the basis of said update information, the backup computer center including means for updating each of the ones of said plurality of second records corresponding to said ones of the plurality of first records updated, in parallel, according to said update sequence number for each of said ones of said plurality of first records updated.

2. The highly reliable online system according to claim 1, further comprising means for performing a physical assignment of said backup database to a backup database recording medium in said backup computer center independently of the physical assignment of said original database to an original database recording medium in said original computer center.

3. The highly reliable online system according to claim 1 further comprising:
means for changing over said backup computer center to be connected to said terminals in place of said original computer center when said original computer center is inoperable; and,
means for updating said ones of said plurality of second records in said backup database on the basis of second transactions inputted from said terminals.

4. The high speed database recovery system according to claim 1 further comprising means for recovering said original database from a failure on the basis of said backup database, and means for recovering said backup database from a failure on the basis of said original database to thereby perform the database recovery in a reduced time.

5. A highly reliable online system comprising:
an original computer center for updating ones of a plurality first records in an original database on the basis of preselected first transactions inputted from terminals connected to the original computer center, the first transactions affecting the contents of said original database, and delivering update information on updates performed to said original database, the update information including an update sequence number for each of said ones of said plurality of first records updated, the update sequence number for each of said ones of said plurality of first records being incremented for each update to said first records by said original computer center;
a backup computer center coupled to the original computer center for receiving said update information for updating ones of a plurality of second records related to said ones of said plurality of first records in a backup database corresponding to said original database on the basis of said update information; and
transmission path means coupling said original computer center to said backup computer center for multiplexedly transmitting said update information, said transmission path means including changing over means in said backup computer center for changing over said backup computer to be connected to a part of said terminals in place of said original computer center when said transmission path means is inoperable and means in said backup computer center for updating related records in said backup database on the basis of transactions inputted from the part of said terminals.

6. The system according to claim 5 further comprising:
first recovery means for recovering the contents of said original database from the contents of said backup database upon a failure of said system; and,
second recovery means for recovering the contents of said backup database from the contents of said original database upon a second failure of said system, to thereby perform the database recovery in a minimal time.

7. A highly reliable online system comprising:
an original computer center for i) updating ones of a plurality of first records in an original database on the basis of transactions inputted from terminals connected to the original computer center, and ii) multiplexedly delivering update information on updates performed to said ones of plurality of first records in said original database, the update information including an update sequence number for each of said ones of said plurality of first records updated, the update sequence number for each of said ones of said plurality of first records updated being incremented for each update to corresponding ones of said plurality of first records by said original computer center; and, a backup computer center, coupled to said original computer center, for multiplexedly receiving said update information for updating ones of a plurality of second records related to said one of said plurality of first records, in a backup database connected to the backup computer center and corresponding to said original database on the basis of said update information, the backup computer center including i) means for incrementing update sequence numbers each included in said ones of said plurality of second records by one, ii) means for temporarily preserving said received update information including update sequence numbers larger than corresponding ones of said incremented update sequence numbers, iii) means for updating said ones of said plurality of second records corresponding to said received update information including update sequence numbers equal to said corresponding incremented update sequence numbers, iv) means for cancelling updates related to said received update information including update sequence numbers smaller than corresponding ones of said incremented update sequence numbers and i) means for updating said ones of said plurality of second records corresponding to said temporarily preserved ones of said update information in due order according to the update sequence numbers included therein, wherein processing of each of said ones of said plurality of second records are performed in parallel.

* * * * *